United States Patent
Rank

(10) Patent No.: US 12,445,868 B2
(45) Date of Patent: Oct. 14, 2025

(54) CAPACITY MANAGEMENT FOR NETWORK MANAGEMENT SYSTEMS

(71) Applicant: T-MOBILE INNOVATIONS LLC, Overland Park, KS (US)

(72) Inventor: Sean J. Rank, Spring Hill, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 368 days.

(21) Appl. No.: 18/316,861

(22) Filed: May 12, 2023

(65) Prior Publication Data
US 2024/0381123 A1    Nov. 14, 2024

(51) Int. Cl.
*H04W 24/02* (2009.01)

(52) U.S. Cl.
CPC .................. *H04W 24/02* (2013.01)

(58) Field of Classification Search
CPC ..... H04W 24/02; H04W 84/06; H04W 88/06; H04L 12/4604
See application file for complete search history.

(56) References Cited

U.S. PATENT DOCUMENTS

| | | | | |
|---|---|---|---|---|
| 9,229,902 B1 * | 1/2016 | Leis | ........................... | G06F 8/65 |
| 10,254,980 B1 * | 4/2019 | Patel | ....................... | G06F 3/061 |
| 11,343,373 B1 | 5/2022 | Bodiga et al. | | |
| 11,520,550 B1 * | 12/2022 | Bushnell | .................. | H04R 5/04 |
| 2014/0327685 A1 * | 11/2014 | Lee | ................ | H04N 21/234354 |
| | | | | 345/520 |
| 2015/0072638 A1 * | 3/2015 | Shaw | ..................... | H04H 60/31 |
| | | | | 455/404.1 |
| 2016/0225348 A1 * | 8/2016 | Maiya | ................... | G06F 1/3206 |
| 2020/0356087 A1 * | 11/2020 | Elbsat | ............... | G05B 23/0254 |
| 2020/0364086 A1 * | 11/2020 | Gavali | ............... | G06F 11/3414 |
| 2021/0406075 A1 * | 12/2021 | Illikkal | ................. | G06F 9/4881 |
| 2022/0038923 A1 | 2/2022 | Lee | | |
| 2022/0239395 A1 | 7/2022 | Khafizov et al. | | |
| 2024/0330077 A1 * | 10/2024 | Pasupathilingam | .... | G06F 9/546 |

* cited by examiner

*Primary Examiner* — Christine Ng
(74) *Attorney, Agent, or Firm* — SHOOK, HARDY & BACON L.L.P.

(57) ABSTRACT

The technology disclosed herein relates to systems, methods, media, other types of technologies, or one or more combinations thereof, for enhancing network capacity management and other types of network management. In embodiments, a connection with network operation systems (e.g., network managers) can be established using a multi-network management system. For example, the multi-network management system can transmit or receive signals to or from each radio access network (RAN) node that is in communication with each of the network operation systems. The multi-network management system can also receive network performance data (e.g., key performance indicators (KPIs)) for each RAN node. Based on the network performance data, the multi-network management system can determine a degradation for at least one RAN node. Based on the degradation, the multi-network management system can adjust a rate at which one of the network managers receives additional network performance data from the at least one RAN node.

20 Claims, 5 Drawing Sheets

CAPACITY MANAGEMENT FOR NETWORK MANAGEMENT SYSTEMS

SUMMARY

A high-level overview of various aspects of the invention is provided here for that reason, to provide an overview of the disclosure and to introduce a selection of concepts that are further described in the detailed-description section below. This summary is not intended to identify key features or essential features of the claimed subject matter, nor is it intended to be used as an aid in isolation to determine the scope of the claimed subject matter. The present disclosure is directed, in part, to technology associated with managing capacities for network management systems, substantially as shown in and/or described in connection with at least one of the figures, and as set forth more completely in the claims.

In aspects set forth herein, and at a high level, the technology described herein relates to a multi-network management system capable of communicating with a plurality of radio access network (RAN) nodes via a plurality of network operation systems (e.g., network managers), wherein each network operating system that is in communication with the multi-network management system corresponds to one or more RAN nodes. A RAN node may include, for example, one or more core network nodes, relay devices, integrated access and backhaul nodes, macro cells, small cells, picocells, relay base stations, other types of base stations, other network components, or one or more combinations thereof. In embodiments, a network operations system managed by the multi-network management system can include a network manager for classical RAN, cloud RAN, mobile and packet core and enterprises, end-to-end 4G/5G radio slicing operations, other types of network management operations, or one or more combinations thereof.

In embodiments, the multi-network management system can provide for capacity management of the plurality of RAN nodes based on key performance indicators (KPIs) or other types of network performance data. A KPI can provide an indication of an enhancement or a degradation of a quality of a telecommunication service provided. For example, a KPI can include one or more of RAN node antenna KPIs, historical RAN node antenna KPIs, user device KPIs, historical user device KPIs, other network component KPIs, or one or more combinations thereof. In some embodiments, one or more KPIs can correspond to radio access global standards for mobile communications (GSM), universal mobile telecommunications system (UMTS), long term evolution (LTE) mobile networks, 5G networks, other types of network systems, or one or more combinations thereof. In some embodiments, a KPI is categorized as accessibility, retainability, integrity, another type of category, or one or more combinations thereof.

In embodiments, the multi-network management system can determine a degradation for a first RAN node of the plurality of RAN nodes based on receiving a first set of KPIs or other types of network performance data. For example, the network performance data can include packet metrics including queue length, round trip time, retry ration, other types of network performance data, or one or more combinations thereof. In some embodiments, the degradation can be due to packet congestions within a particular wireless network, transmission control protocol timeouts, lost packets and transmission control protocol false assumptions about the lost packet, degradation due to a particular network component, a delay in a base station adopting a transmission configuration or a transient in link performance, channel state feedback inconsistency after an Rx beam switch, a channel state feedback mismatch between a user device channel state feedback report and a changed channel state information, degradation associated with channel quality information and a modulation coding scheme, degradation associated with a particular telecommunication service, another type of degradation, or one or more combinations thereof.

Based on determining the degradation corresponding to the particular RAN node, the multi-network management system can modify an operation for at least one network manager of the plurality of network managers. For example, the multi-network management system can adjust a rate at which the at least one network manager receives additional network performance data from the degraded RAN node. In some aspects, the rate can be increased for a predetermined period of time. In other aspects, rates at which other RAN nodes report the network performance data to their corresponding network manager can be decreased based on those RAN nodes not having a degradation. Continuing this example, those rates can be decreased based on a capacity of their respective network manager. Similarly, the rate at which the at least one network manager receives additional network performance data from the degraded RAN node can be increased based on a capacity for that respective network manager.

This summary is provided to introduce example concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
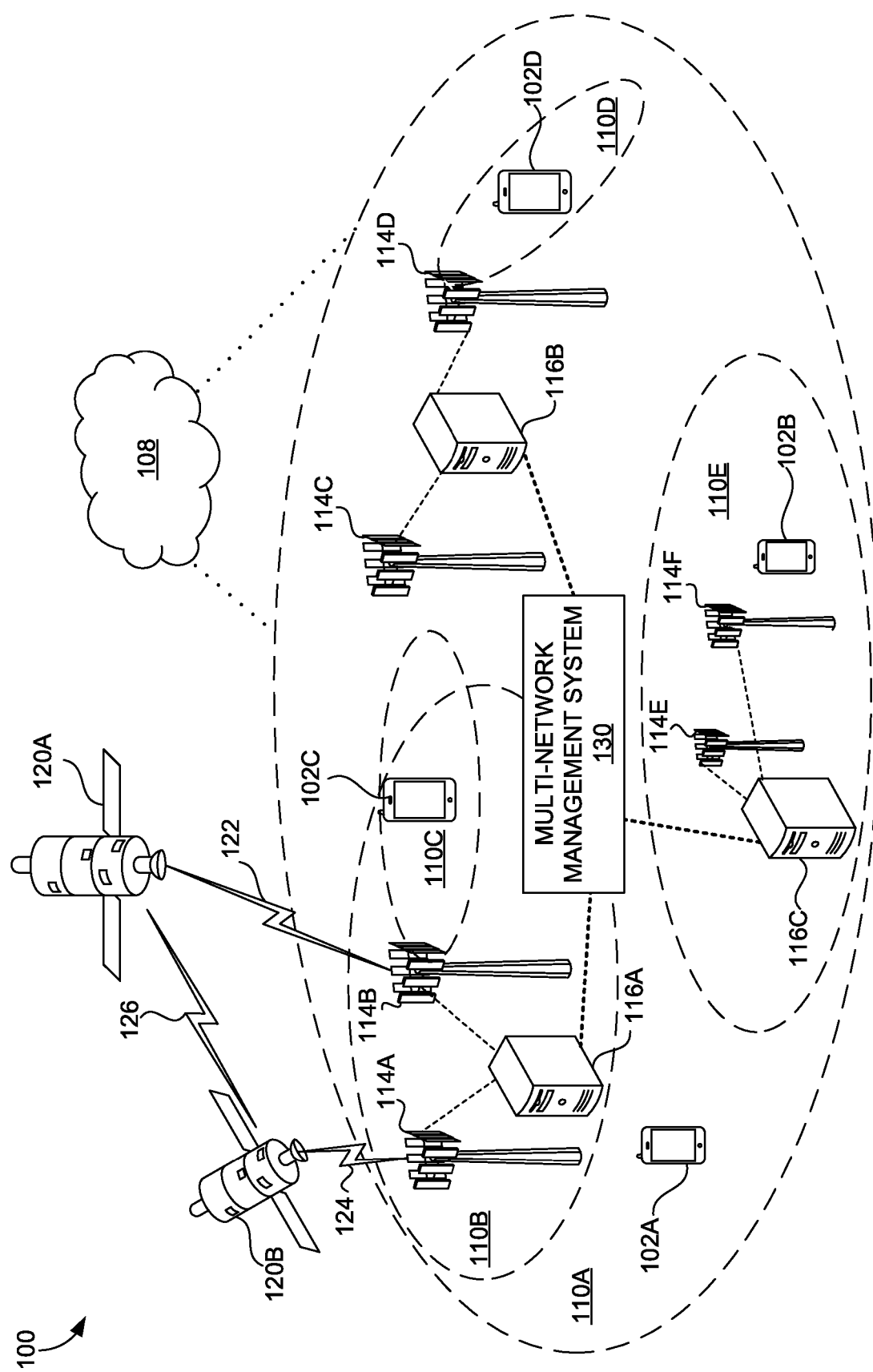
FIG. 1 depicts an example operating environment for the multi-network management system, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

| | |
|---|---|
| 3G | Third-Generation Cellular Communication System |
| 4G | Fourth-Generation Cellular Communication System |
| 5G | Fifth-Generation Cellular Communication System |
| CD-ROM | Compact Disk Read Only Memory |
| CDMA | Code Division Multiple Access |
| CQI | Channel Quality Information |
| CS | Circuit Switch |
| CSF | Channel State Feedback |
| CSI | Channel State Information |
| D2D | Device-to-Device |
| eNB | Evolved Node B |
| gNB | Next Generation Node B |
| GPRS | General Packet Radio Service |
| GSM | Global System for Mobile communications |
| DVD | Digital Versatile Discs |
| EEPROM | Electrically Erasable Programmable Read Only Memory |
| eMBB | enhanced Mobile Broadband |
| EMS | Enhanced Messaging Service |
| E-RAB | E-UTRAN Radio Access Bearer |
| E-UTRAN | Evolved Universal Terrestrial Radio Access Network |
| FD-MIMO | Full-Dimension Multiple-Input Multiple-Output |
| GPS | Global Positioning System |
| GSM | Global Standards for Mobile communications |
| IoT | Internet of Things |
| KPI | Key Performance Indicator |
| LAN | Local Area Network |
| LTE | Long Term Evolution |
| MCS | Modulation Coding Scheme |
| MIMO | Multiple-Input Multiple-Output |
| mm wave | Millimeter wave |
| MME | Mobility Management Entity |
| MMS | Multimedia Messaging Service |
| mMTC | massive Machine Type Communications |
| MU-MIMO | Multi-User Multiple-Input Multiple-Output |
| NR | New Radio |
| P2P | Peer-to-Peer |
| PC | Personal Computer |
| PDA | Personal Digital Assistant |
| PDP | Packet Data Protocol |
| QoS | Quality of Service |
| RAM | Random Access Memory |
| RAN | Radio Access Network |
| RAT | Radio Access Technology |
| RBS | Radio Base Station |
| RF | Radio-Frequency |
| ROM | Read Only Memory |
| RRC | Radio Resource Control |
| RSRP | Reference Signal Received Power |
| RSRQ | Reference Transmission Receive Quality |
| RSSI | Received Signal Strength Indicator |
| SDCCH | Stand-alone Dedicated Control Channel |
| SINR | Signal to Interference and Noise Ratio |
| SMS | Short Message Service |
| SNR | Signal-to-Noise Ratio |
| SRS | Sound Reference Signal |
| TCH | Traffic Channel |
| TDMA | Time Division Multiple Access |
| UE | User Equipment |
| UMTS | Universal Mobile Telecommunications System |
| URLLC | Ultra-Reliable Low Latency Communications |
| VLAN | Virtual Local Area Network |

In addition, words such as "a" and "an," unless otherwise indicated to the contrary, may also include the plural as well as the singular. Thus, for example, the constraint of "a feature" is satisfied where one or more features are present. Furthermore, the term "or" includes the conjunctive, the disjunctive, and both (a or b thus includes either a or b, as well as a and b).

Unless specifically stated otherwise, descriptors such as "first," "second," and "third," for example, are used herein without imputing or otherwise indicating any meaning of priority, physical order, arrangement in a list, or ordering in any way, but are merely used as labels to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Further, the term "some" may refer to "one or more." Additionally, an element in the singular may refer to "one or more."

The term "combination" (e.g., one or more combinations thereof) may refer to, for example, "at least one of A, B, or C"; "at least one of A, B, and C"; "at least two of A, B, or C" (e.g., AA, AB, AC, BB, BA, BC, CC, CA, CB); "each of A, B, and C"; and may include multiples of A, multiples of B, or multiples of C (e.g., CCABB, ACBB, ABB, etc.). Other combinations may include more or less than three options associated with the A, B, and C examples.

As used herein, the phrase "based on" shall be construed as a reference to an open set of conditions. For example, an example step that is described as "based on X" may be based on both X and additional conditions, without departing from the scope of the present disclosure. In other words, as used herein, the phrase "based on" shall be construed in the same manner as the phrase "based at least in part on."

The term "mm wave," as used herein, may refer to the extremely high frequency band (e.g., from 30 GHz to 300 GHz). Additionally or alternatively, in some embodiments, a mm wave transmission includes one or more frequency ranges of 24 GHz, 26 GHz, 28 GHz, 39 GHz, and 52.6-71 GHz.

Additionally, a "user device," as used herein, is a device that has the capability of using a wireless communications network, and may also be referred to as a "computing device," "mobile device," "user equipment," "wireless communication device," or "UE." A user device, in some aspects, may take on a variety of forms, such as a PC, a laptop computer, a tablet, a mobile phone, a PDA, a server, or any other device that is capable of communicating with other devices (e.g., by transmitting or receiving a signal) using a wireless communication. A user device may be, in some embodiments, similar to user devices 102A-102D described herein with respect to FIG. 1, similar to user devices 202A-202D described herein with respect to FIG. 2, or similar to user device 500 described herein with respect to FIG. 5.

In embodiments, a user device may include internet-of-things devices, such as one or more of the following: a sensor, controller (e.g., a lighting controller, a thermostat), appliances (e.g., a smart refrigerator, a smart air conditioner, a smart alarm system), other internet-of-things devices, or one or more combinations thereof. Internet-of-things devices may be stationary, mobile, or both. In some aspects, the user device is associated with a vehicle (e.g., a video system in a car capable of receiving media content stored by a media device in a house when coupled to the media device via a local area network). In some aspects, the user device comprises a medical device, a location monitor, a clock, other wireless communication devices, or one or more combinations thereof. In some aspects, the user device is a wearable device having a camera, microphone, RFID, GPS, another sensor, or one or more combinations thereof, to capture data in real-time or near real-time (e.g., one or more strings of text, image data, video data, audio data, location data, other types of data, or one or more combinations thereof).

The wearable devices and other user devices, for example, can transmit the data obtained by their corresponding sensors to other user devices. For example, the sensor data obtained by a user device can be further transmitted for another user device to perform positional tracking (e.g., six degrees of freedom positional tracking) associated with the user device capturing the sensor data in real-time. In embodiments, a user device can access sensors, application data, tracking data, map data, other user device data, or one or more combinations thereof, for packet transmissions to a user device. In some embodiments, a wearable device can be a watch-type electronic device, a glasses-type wearable device, an upper-torso wearable device (e.g., a shirt having sensors affixed on or within the material of the shirt or a device that is attachable to the shirt), another type of wearable device, or one or more combinations thereof.

In aspects, a user device discussed herein may be configured to communicate using one or more of 4G (e.g., LTE), 5G, 6G, another generation communication system, or one or more combinations thereof. In some aspects, the user device has components to establish a 5G connection with a 5G gNB, and to be served according to 5G over that connection. In some aspects, the user device may be an E-UTRAN New Radio-Dual Connectivity (ENDC) device. ENDC allows a user device to connect to an LTE eNB that acts as a master node and a 5G gNB that acts as a secondary node. As such, in these aspects, the ENDC device may access both LTE and 5G simultaneously, and in some cases, on the same spectrum band.

"Telecommunication service" refers to the transfer of information (e.g., without the use of an electrical conductor as the transferring medium). Telecommunication services may be provided by one or more telecommunication network providers. Telecommunication services may include, but are not limited to, the transfer of information via radio waves (e.g., Bluetooth®), satellite communication, infrared communication, microwave communication, Wi-Fi, mm wave communication, and mobile communication. Embodiments of the present technology may be used with different telecommunication technologies or standards, including, but not limited to, CDMA 1× Advanced, GPRS, Ev-DO, TDMA, GSM, WiMAX technology, LTE, LTE Advanced, other technologies and standards, or one or more combinations thereof.

A "network" providing the telecommunication services (e.g., network 108 of FIG. 1) may be one or more telecommunications networks, or a portion thereof. The telecommunications network might include an array of devices or components (e.g., one or more base stations). The network can include multiple networks, and the network can be a network of networks. In embodiments, the network or a portion thereof is a core network, such as an evolved packet core, which may include at least one MME, at least one serving gateway, and at least one Packet Data Network gateway. The MME may manage non-access stratum (e.g., control plane) functions such as mobility, authentication, and bearer management for other devices associated with the evolved packet core.

In some aspects, a network can connect one or more user devices to a corresponding immediate service provider for services such as 5G and LTE, for example. In aspects, the network provides telecommunication services comprising one or more of a voice service, a message service (e.g., SMS messages, MMS messages, instant messaging messages, an EMS service messages), a data service, other types of telecommunication services, or one or more combinations thereof, to user devices or corresponding users that are registered or subscribed to a telecommunication service provider to utilize the one or more services. The network can comprise any communication network providing voice, message, or data service(s), such as, for example, a 1× circuit voice, a 3G network (e.g., CDMA, CDMA2000, WCDMA, GSM, UMTS), a 4G network (WiMAX, LTE, HSDPA), a 5G network, a 6G network, another generation network, or one or more combinations thereof.

Components of the telecommunications network, such as terminals, links, and nodes (as well as other components), can provide connectivity in various implementations. For example, components of the network may include core network nodes, relay devices, integrated access and backhaul nodes, macro eNBs, small cell eNBs, gNBs, relay base stations, other network components, or one or more combinations thereof. The network may interface with one or more base stations through one or more wired or wireless backhauls. As such, the one or more base stations may communicate to devices via the network or directly. Furthermore, user devices can utilize the network to communicate with other devices (e.g., a user device(s), a server(s), etc.) through the one or more base stations.

As used herein, the term "base station" (used for providing UEs with access to the telecommunication services) generally refers to one or more base stations, nodes, RRUs control components, and the like (configured to provide a wireless interface between a wired network and a wirelessly connected user device). A base station may comprise one or more RAN nodes (e.g., eNB, gNB, and the like) that are configured to communicate with user devices. In some aspects, the base station may include one or more band pass filters, radios, antenna arrays, power amplifiers, transmitters/receivers, digital signal processors, control electronics, GPS equipment, and the like. A base station may be, in some embodiments, similar to base stations 114A-114F described herein with respect to FIG. 1 or similar to base stations 214A-214F described herein with respect to FIG. 2.

In embodiments, the "RAN node" may refer to a base transceiver station, a radio base station, an access point, a radio transceiver, a NodeB, an eNB, a gNB, a Home NodeB, a Home eNodeB, another type base station, or one or more combinations thereof. The RAN node may comprise one or more of a macro base station, a small cell or femtocell base station, a relay base station, another type of base station, or one or more combinations thereof. In aspects, the RAN node may be configured as FD-MIMO, massive MIMO, MU-MIMO, cooperative MIMO, 3G, 4G, 5G, another generation communication system, or one or more combinations thereof. In addition, the RAN node may operate in an extremely high frequency region of the spectrum (e.g., from 30 GHz to 300 GHz), also known as the millimeter band.

Embodiments of the technology described herein may be embodied as, among other things, a method, system, or computer-program product. Accordingly, the embodiments may take the form of a hardware embodiment, or an embodiment combining software and hardware. An embodiment that takes the form of a computer-program product can include computer-useable instructions embodied on one or more computer-readable media.

Computer-readable media include both volatile and nonvolatile media, removable and non-removable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal (e.g., a modulated data signal referring to a propagated signal that has one or more of its characteristics set or changed to encode information in the signal). Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, prior relevant technologies have had drawbacks associated with managing telecommunication services provided by base station nodes. For example, prior relevant technologies have not provided a multi-network management system capable of communicating with a plurality of network operation systems and base station nodes corresponding to the network operation systems. As another example, these prior relevant technologies have not modified particular operations of particular network operations systems and particular base station nodes based on receiving particular network performance data, such as modifying an operation associated with a rate at which the network operation system receives the network performance data. As such, these prior relevant technologies have had challenges that involve base station node degradation that has been undetected or that has not been remedied. Accordingly, these prior relevant technologies can involve signal fading, decreased throughput, and decreases in quality of service and user device experiences.

The technology provided herein can alleviate the problems discussed above. For example, the technology disclosed herein enhances network resource utilization, decreases signal fading, increases uplink and downlink throughput, and improves communications between or among user devices by improving quality of service and user device experience. Further, the technology and corresponding techniques can enhance the reliability and functionality of communications. In an embodiment, a method is provided for capacity management. The method comprises receiving, via a multi-network management system, a plurality of KPIs from a plurality of network managers, each of the plurality of network managers corresponding to one or more RAN nodes. The method also comprises determining, via the multi-network management system, that at least one of the plurality of KPIs is above a degradation threshold. The method also comprises determining, via the multi-network management system, a degradation for at least one RAN node of the plurality of RAN nodes based on the at least one of the plurality of KPIs being above the degradation threshold. Based on the degradation for the at least one RAN node, the method includes increasing the rate, via the multi-network management system, at which a first network manager of the plurality of network managers receives a first set of KPIs from the at least one RAN node, the rate being based on a first capacity associated with the first network manager.

In another embodiment, a system is provided for capacity management. The system comprises a plurality of radio access network (RAN) nodes comprising a first set of RAN nodes and a second set of RAN nodes, the first set of RAN nodes being above a threshold distance from the second set of RAN nodes. The system also comprises a first network manager in communication with the first set of RAN nodes and a second network manager in communication with the second set of RAN nodes. The system also comprises a multi-network management system capable of communicating with the plurality of RAN nodes for capacity management of the plurality of RAN nodes based on key performance indicators (KPIs), the multi-network management system configured to perform operations. Those operations include receiving, from the first network manager and the second network manager, a first set of KPIs that includes at least one KPI for each of the plurality of RAN nodes. The operations also include determining a degradation for a first RAN node of the first set of RAN nodes based on receiving the first set of KPIs. Based on the degradation for the first RAN node, the operations also include increasing the rate at which the first network manager receives a second set of KPIs from the first RAN node, the rate being based on a first capacity associated with the first network manager and the first set of RAN nodes.

In yet another embodiment, computer storage media is provided for capacity management. For example, one or more non-transitory computer storage media having computer-executable instructions embodied thereon, that when executed by at least one processor, cause the at least one processor to perform a method. The method includes establishing a connection with a plurality of network managers, wherein each of the plurality of network managers are in communication with one or more RAN nodes. The method also includes receiving network performance data from a first network manager of the plurality of network managers for each of the one or more RAN nodes in communication with the first network manager. The method also includes determining a degradation for at least one RAN node in communication with the first network manager based on receiving the network performance data. Based on the degradation for the at least one RAN node, the method also includes causing an increase in the rate at which the first network manager of the plurality of network managers receives a first set of network performance data from the at least one RAN node.

Those skilled in the art will appreciate that the computing devices described herein need not be limited to conventional personal computers, and can include other computing configurations, including servers, hand-held devices, multi-processor systems, a microprocessor based or programmable consumer electronics, network PCs, minicomputers, mainframe computers, other computing devices, or one or more combinations thereof. Similarly, the computing devices need not be limited to stand-alone computing devices, as the mechanisms may also be practiced in distributed computing environments where tasks are performed by remote processing devices that are linked through a wireless telecommunications network. In a distributed computing environment, program modules may be located in both local and remote memory storage devices.

Turning now to FIG. 1, example operating environment 100 supports the multi-network management system within one or more telecommunications networks, in accordance with one or more embodiments disclosed herein. Example environment 100 is but one example of a suitable environment for the multi-network management system and the associated techniques disclosed herein, and is not intended to suggest any limitation as to the scope of use or functionality of the invention. Neither should the environment 100 be interpreted as having any dependency or requirement relating to any one or combination of components illustrated. For example, in some embodiments, the example operating environment 100 can include additional components not depicted.

Example operating environment 100 includes user devices 102A-102D, network 108, coverage areas 110A-110E, base stations 114A-114F, network managers 116A-116C, satellites 120A and 120B, communication link 124 corresponding to satellite 120B and base station 114A, communication link 122 corresponding to satellite 120A and base station 114B, communication link 126 between satellites 120A and 120B, and multi-network management system 130. Example operational environment 100 is but one example environment for the multi-network management system 130. For example, another embodiment may include additional base stations.

Example operating environment 100 having network 108 and coverage area 110A may be associated with one or more of a non-terrestrial network, an LTE network, an LTE-A network, an LTE-A Pro network, an NR network, a mm wave network, another type of network, or one or more combinations thereof. In some embodiments, the example operating environment 100 may support enhanced broadband communications, ultra-reliable (e.g., mission critical) communications, low latency communications, communications with low-cost and low-complexity devices, another type of communication, or one or more combinations thereof. In some embodiments, one or more communications between one or more devices in example operating environment 100 may correspond to the enhanced broadband communication, ultra-reliable communication, low latency communication, another type of communication, or one or more combinations thereof.

In embodiments, example environment 100 can utilize both licensed and unlicensed radio frequency bands. For example, the example environment 100 may employ License Assisted Access, LTE-Unlicensed radio access technology, or NR technology in an unlicensed band (e.g., 5 GHz industrial, scientific, and medical band). When operating in unlicensed radio frequency bands, base stations, satellites, or user devices may employ carrier sensing for collision avoidance and detection. In some examples, operations in unlicensed bands may be based on a carrier aggregation configuration and component carriers operating in a licensed band. Operations in unlicensed spectrum may include downlink transmissions, uplink transmissions, P2P transmissions, D2D transmissions, another type of unlicensed spectrum operation, or one or more combinations thereof. As such, one or more communications corresponding to the multi-network management system 130 may correspond to a licensed or unlicensed radio frequency band, a 5 GHz industrial band, a 5 GHz scientific band, a 5 GHz medical band, a particular carrier aggregation configuration of a licensed band, a P2P transmission, a D2D transmission, another type of spectrum operation, or one or more combinations thereof.

In embodiments, user devices 102A-102D may wirelessly communicate via one or more wireless telecommunication services provided by one or more base stations (e.g., user device 102B may wireless communicate via a wireless telecommunication service provided by base station 114E or 114F), one or more satellites (e.g., user device 102A may wireless communicate via a wireless telecommunication service provided by satellite 120A, 120B another satellite, or one or more combinations thereof), other types of wireless telecommunication devices, or one or more combinations thereof. In example environment 100, network 108, base stations 114A-114F, and satellites 120A-120B can provide coverage area 110A for supporting communication signals according to one or more radio access technologies. Supported communication signals within coverage area 110A can include MU-MIMO and SU-MIMO transmissions, for example. As such, one or more communications corresponding to the multi-network management system 130 may correspond to the wireless telecommunication services provided within coverage area 110A.

In embodiments, the user devices 102A-102D can be stationary, mobile, or one or more combinations thereof at different times. The user devices 102A-102D may be able to communicate with various types of devices, such as other UEs, various types of base stations, or various types of network components (e.g., one or more RAN nodes including one or more core network nodes, relay devices, integrated access and backhaul nodes, other types of RAN nodes, or one or more combinations thereof). In embodiments, one or more of the user devices 102A-102D may have different capabilities. For instance, a user device can be wearable devices having a camera, microphone, RFID, GPS, another sensor, or one or more combinations thereof. In some embodiments, a user device is a wearable device can be a watch-type electronic wearable device, a glasses-type wearable device, an upper-torso wearable device (e.g., a shirt having sensors affixed on or within the material of the shirt or a device that is attachable to the shirt), another type of wearable device, or one or more combinations thereof.

In embodiments, one or more of the user devices 102A-102D may include one or more of a unit, a station, a terminal, or a client, for example. The user devices 102A-102D may also include a wireless local loop station, an IoT device, an Internet of Everything device, a machine type communication device, an evolved or enhanced machine type communication device, another type of user device, or one or more combinations thereof. The machine type communication device or the evolved or enhanced machine type communication device may include, for example, one or more robots, drones, remote devices, sensors, meters, monitors, location tags, etc., that may communicate with a base station, another device (e.g., remote device), or some other entity. In some embodiments, a user device may be implemented in various objects such as appliances, vehicles, meters, or other objects. In some embodiments, one or more of the user devices 102A-102D may, at one time or another, act as a relay, base station, (e.g., a UAV acting as an aerial base station), or the network equipment (e.g., macro eNBs or gNBs, small cell eNBs or gNBs, or relay base stations). As such, in some embodiments, one or more signals transmitted from the unit, station, terminal, client, wireless local loop station, IoT device, Internet of Everything device, machine type communication device, evolved or enhanced machine type communication device, user device implemented in an object, another type of user device, or one or more combinations thereof, can be received by the multi-network management system 130 (e.g., through network managers 116A-116C).

Coverage area 110A can provide services from network 108, such as network provider services including the Internet, Intranet, Internet Protocol Multimedia Subsystem, Packet-Switched Streaming Service, another type of network provider service, or one or more combinations thereof. In embodiments, one or more of the user devices 102A-102D, base stations 114A-114F, satellites 120A-120B, multi-network management system 130, or one or more combinations thereof, can be configured to support ultra-reliable communications, low-latency communications, mission critical communications, ultra-reliable low-latency communications, ultra-reliable functions, low-latency functions, critical functions, mission critical push-to-talk functions, mission critical video functions, other types of communications, or one or more combinations thereof, associated with the multi-network management system 130. In addition, the multi-network management system 130 may receive or transmit signals corresponding to a network provider service (e.g., Internet, Intranet, Internet Protocol Multimedia Subsystem, Packet-Switched Streaming Service).

In embodiments, one or more of the multi-network management system 130, base stations 114A-114F, satellites 120A-120B, or one or more combinations thereof, can communicate with the telecommunications network 108 via a core network, one or more network components (e.g., a core network node, a relay device, an MME, an integrated access and backhaul node, a macro eNB, a small cell eNB, a gNB, a relay base station), or one or more combinations thereof. In some embodiments, one or more of base stations 114A-114F, satellite 120A, satellite 120B, or one or more combinations thereof, communicate with the telecommunications network 108 over one or more backhaul links (e.g., via an X2, Xn, or other interface) either directly (e.g., directly between base stations), or indirectly (e.g., via core network), or one or more combinations thereof. The backhaul links may be or include one or more wireless links, for example.

In embodiments, RAN nodes including base stations 114A-114F may operate using MIMO transmissions. For example, one or more of the RAN nodes including base stations 114A-114F can be configured as FD-MIMO, massive MIMO, MU-MIMO, cooperative MIMO, 4G, 5G, another generation communication system, or one or more combinations thereof, for providing telecommunication services to one or more of user devices 102A-102D. In embodiments, one or more of the RAN nodes including base stations 114A-114F can perform one or more of the following functions: transfer user data, radio channel ciphering and deciphering, integrity protection, header compression, mobility control functions (e.g., handover, dual connectivity), inter-cell interference coordination, connection setup and release, load balancing, distribution for a non-access stratum message or node selection, a synchronization, radio access network sharing, multimedia broadcast multicast service, subscriber and equipment trace, radio access network information management, paging, positioning, delivery of warning messages, other functions, or one or more combinations thereof. As such, one or more of the one or more of the RAN nodes including base stations 114A-114F can be associated with the FD-MIMO, massive MIMO, MU-MIMO, cooperative MIMO, 4G, 5G, another generation communication system, one or more of the corresponding functions of such system, or one or more combinations thereof.

In some embodiments, one or more RAN node antennas (or antenna arrays) having antenna elements may be co-located at an antenna assembly, such as an antenna tower. In some examples, antennas or antenna arrays associated with the RAN nodes including base stations 114A-114F can be located in diverse geographic locations. In embodiments, antenna elements of one or more antennas may each be within a threshold distance from at least one of the other antenna elements. In some aspects, one or more nodes corresponding to base stations 114A-114F may comprise one or more macro cells, one or more small cells, one or more relay base stations, one or more repeaters, one or more femtocells, other types of cells, or one or more combinations thereof. In other embodiments, one or more of the RAN nodes including base stations 114A-114F can be movable, thereby providing communication coverage for a moving geographic coverage area (e.g., coverage area 110D). In some embodiments, one or more antennas of RAN nodes including base stations 114A-114F can use MIMO antenna technology, including spatial multiplexing, beamforming, transmit diversity, other MIMO functions, or one or more combinations thereof.

In embodiments, one of more RAN nodes can include one or more of the satellites 120A-120B, which may communicate with other types of RAN nodes (e.g., the base stations 114A-114F, user devices 102A-102D, or other high altitude or terrestrial RAN nodes). "Satellite" may also be referred to as a space vehicle or communication satellite. Satellites 120A-120B may be any suitable type of communication satellite configured to relay communications between different RAN nodes or RAN end nodes in a wireless communication system. Satellites 120A-120B may be or include a space satellite, a balloon, a dirigible, an airplane, a drone, an unmanned aerial vehicle, another type of satellite, or one or more combinations thereof. In some examples, the satellites 120A-120B may be in a geosynchronous or geostationary earth orbit, a low earth orbit, a medium earth orbit, another type of orbit, or one or more combinations thereof. In some embodiments, satellites 120A-120B may be a multi-beam satellite configured to provide service for multiple service beam coverage areas in a predefined geographical service area (e.g., coverage area 110A). The satellites 120A-120B may be any distance away from the surface of the earth.

In some embodiments, the multi-network management system 130 can receive network performance data (e.g., a KPI) from one or more of the satellites 120A and 120B based on the connection between the multi-network management system 130 and one or more of network managers 116A, 116B, and 116C. The multi-network management system 130 may interface with one or more of network managers 116A, 116B, and 116C through one or more wired or wireless backhauls (e.g., via an X2, Xn, or other interface) either directly (e.g., directly between the multi-network management system 130 and network manager 116B), or indirectly (e.g., via core network), or one or more combinations thereof. In some embodiments, the multi-network management system 130 can receive the network performance data associated with one or more of satellites 120A and 120B (e.g., the space satellite, balloon, dirigible, airplane, drone, unmanned aerial vehicle, multi-beam satellite, other type of satellite, or one or more combinations thereof). For example, the network performance data corresponding to satellite 120A or 120B may include packet metrics including queue length, round trip time between satellite 120A and satellite 120B, round trip time between satellite 120A and base station 114B, round trip time between satellite 120B and base station 114A, round trip time between satellite 120A and user device 102C, round trip time between satellite 120A or satellite 120B and network manager 116A, retry ration, path loss, other types of network performance data, or one or more combinations thereof.

In some embodiments, satellites 120A-120B may be deployed at an altitude of 18 km to 25 km (e.g., a geostationary balloon satellite), wherein the stratosphere has low wind speeds (e.g., 5 m/s to 40 m/s) and low turbulence. In embodiments, satellites 120A and 120B may be configured to communicate with each other (e.g., via communication link 126). As such, the communication link 126 may include a free space optical link, a microwave link, electromagnetic wave signals via mm wave signals, optical signals via a laser, another type of communication link, or one or more combinations thereof. In embodiments, satellites 120A-120B may be configured to communicate via a wireless common public radio interface protocol, a dedicated wireless front haul protocol developed for high-altitude-to-high-altitude, another protocol, or one or more combinations thereof. As such, in some embodiments, the network performance data corresponding to satellite 120A or 120B and received by multi-network management system 130 may correspond to a measurement of the free space optical link, microwave link, electromagnetic wave signals via mm wave signals, optical signals via laser, wireless common public radio interface protocol, a dedicated wireless front haul protocol developed for high-altitude-to-high-altitude, the other type of communication link, or one or more combinations thereof.

In some embodiments, one or more portions of coverage area 110A (e.g., encompassing coverage areas 110B-110E) may be provided or established by satellites 120A-120B as part of a non-terrestrial network. Satellites 120A-120B may, in some cases, perform the functions of a base station or may act as a bent-pipe satellite, act as a regenerative satellite, act as another type of satellite, or one or more combinations thereof. In other cases, satellites 120A-120B may be a smart satellite, or a satellite with intelligence. For example, a smart satellite may be configured to perform more functions than a regenerative satellite (e.g., may be configured to perform particular algorithms beyond those used in regenerative satellites or to be reprogrammed, for example). A bent-pipe transponder or satellite may be configured to receive signals from ground base stations (e.g., base stations 114A-114F) and transmit those signals to different ground base stations. In some embodiments, a bent-pipe transponder or satellite may amplify signals or shift from uplink frequencies to downlink frequencies. A regenerative transponder or satellite may be configured to relay signals like the bent-pipe transponder or satellite, but may also use on-board processing to perform other functions. Examples of these other functions may include demodulating a received signal, decoding a received signal, re-encoding a signal to be transmitted, or modulating the signal to be transmitted, another type of satellite or regenerative transponder function, or one or more combinations thereof. For example, a bent-pipe satellite may receive a signal from a base station and may relay the signal to a user device or base station, or vice-versa. As such, in some embodiments, the multi-network management system 130 can receive the network performance data associated with one or more of these types of satellites (e.g., bent-pipe satellite, regenerative satellite, smart satellite, other type of satellite, or one or more combinations thereof). In some embodiments, the network performance data corresponds to the demodulated signal, decoded signal, re-encoded signal, modulated signal, another type of satellite or regenerative transponder function, or one or more combinations thereof.

Multi-network management system 130 can be configured to communicate with network managers 116A-116C, as well as other network managers or other network components across a plurality of various geographical regions and coverage areas. In some embodiments, the multi-network management system 130 can be located in a core network corresponding to network 108. The multi-network management system 130 can analyze network performance data, provide degradation determinations and localization, determine network performance data outliers, other types of determinations, end-to-end optimization for RAN nodes within a plurality of coverage areas, and transmit RAN node operation instructions, as well as alerts, notifications, and recommendations associated with particular RAN nodes within a plurality of coverage areas. In some embodiments, the multi-network management system 130 can transmit interface self-configuration and optimization. In some embodiments, the multi-network management system 130 can shift one or more operations or one or more loads between network domains corresponding to the network managers 116A-116C and based on receiving the network performance data from each of the network managers 116A-116C. For example, the multi-network management system 130 can allocate various resources or resource usages corresponding to the plurality of RAN nodes within a plurality of coverage areas. In some embodiments, the multi-network management system 130 can be integrated with operations support systems or customer experience management tools corresponding to each of the network managers 116A-116C. In some embodiments, the multi-network management system 130 can connect to one or more transport provisioning tools (e.g., a software defined networking controller) of the network managers 116A-116C via a standard measurement and configuration interface or can act as a user of one or more of the transport provisioning tools.

In some embodiments, each of network managers 116A-116C are above a threshold distance from each other. In some embodiments, one or more of the network managers 116A-116C include self-organizing network technology that can apply true plug-and-play, self-configuration, and self-optimization. In some embodiments, one or more of the network managers 116A-116C are deployed at an eNB, a signaling gateway, or a system architecture evolution gateway. For example, the network manager 116A can be a software entity running on the eNB or attached to the eNB as a site device. As another example, the network manager 116A can configure transport connectivity of base station 114A and base station 114B. In some embodiments, the network managers 116A-116C can extract real-time quality of experience and QoS measurements (e.g., one or more KPIs) from control plane traffic of the base station 114A and 114B. In some embodiments, one or more of the network managers 116A-116C can implement a closed control loop.

In embodiments, the multi-network management system 130 can receive network performance data (e.g., from network managers 116A-116C) corresponding to one or more of user devices 102A-102D, the base stations 114A-114F, satellites 120A-120B, another network component (e.g., an MME), or one or more combinations thereof. As one example, the network performance data can correspond to communications between user device 102D and base station 114D over coverage area 110D. As another example, the network performance data can correspond to communications between user device 102B and one or more of base stations 114E and 114F (or a handover between base stations 114E and 114F) over coverage area 110E. As another example, the network performance data can correspond to communications between user device 102C and one or more of base stations 114A and 114B (or a handover between base stations 114A and 114B) over coverage areas 110B or 110C. In another example, the network performance data can correspond to communications between user device 102C and satellite 120A, or a handover between satellite 120A and base station 114B.

In yet another example, the network performance data can correspond to an enhanced broadband communication, an ultra-reliable communication, a low latency communication, another type of communication, or one or more combinations thereof, within one or more portions of coverage area 110A. In some embodiments, the network performance data can correspond to a License Assisted Access communication, an LTE-Unlicensed radio access technology communication, an unlicensed band communication, a carrier sensing operation for collision avoidance and detection, a downlink transmission, an uplink transmission, a P2P transmission, a D2D transmission, another type of unlicensed spectrum operation, an FD-MIMO communication, a massive MIMO communication, an MU-MIMO communication, a cooperative MIMO communication, a 4G communication, a 5G communication, another generation communication, another type of communication, or one or more combinations thereof. In some embodiments, the network performance data can correspond to ultra-reliable communications, low-latency communications, mission critical communications, ultra-reliable low-latency communications, RAN node ultra-reliable functions, RAN node low-latency functions, RAN node critical functions, mission critical push-to-talk functions, mission critical imaging functions, another type of coverage area 110A device communication or function, or one or more combinations thereof.

In embodiments, one or more of the user devices 102A-102D, the base stations 114A-114F, satellites 120A-120B, the multi-network management system 130, another network component (e.g., an MME), or one or more combinations thereof, may have one or processors capable of processing network performance data (e.g., KPIs), user device location data, weather data (e.g., humidity data, ultraviolet data, temperature data), ultra-reliable data, low-latency data, critical data, other types of data, or one or more combinations thereof. In some embodiments, the multi-network management system 130 has one or more processors, which may include one or more of a system-on-a-chip, a processor core, a graphics processor unit, a central processing unit, an accelerator (e.g., a digital signal processor, a graphics accelerator, a compression accelerator, an artificial intelligence accelerator), a chipset processor, a general-purpose processor, a general-purpose graphics processor unit, an accelerated processing unit, a field-programmable gate array, a neural network processing unit, a data processor unit, a controller, another type of processor or processor unit, or one or more combinations thereof. In some embodiments, a processor unit of the multi-network management system 130 may be located in a single integrated circuit component (e.g., multi-chip module) or in separate integrated circuit components.

In embodiments, the one or more processors of the multi-network management system 130 can determine a degradation for a first RAN node (e.g., base station 114A, satellite 120A, another network component of coverage area 110A, an antenna element or antenna array of base station 114C, an antenna element or antenna array of satellite 120B) of coverage area 110A based on the network performance data. In one non-limiting example, the one or more processors of multi-network management system 130 can analyze network performance data received in real-time, wherein the network performance data includes a first set of KPIs received during a first predetermined time range at a first predetermined rate, and wherein the KPIs correspond to one or more downlinks from base station 114C to user device 102C. Continuing this example, the KPIs can include measurements of the downlink by user device 102C (e.g., SINR). Additionally or alternatively, the KPIs can correspond to antenna elements of the base station 114C (e.g., antenna tilt and antenna angle).

In some embodiments, the multi-network management system 130 can determine a degradation for a plurality of RAN nodes (e.g., base station 114D and base station 114F, satellite 120B and base station 114C, two or more network components of coverage area 110A, an antenna element of base station 114B and an antenna element of base station 114E, an antenna array of base station 114A and an antenna array of base station 114D) based on a degradation threshold. For example, the degradation for a RAN node can be determined based on a KPI received from the RAN node being above a degradation threshold. In some embodiments, the degradation threshold can correspond to one or more RAN nodes of a network manager (e.g., antenna arrays of base station 114A and network manager 116A). In some embodiments, the degradation threshold can correspond to a capacity of one or more network managers (e.g., a capacity of the network manager 116B or a total capacity of each of network managers 116A-116C).

In embodiments, the multi-network management system 130 can adjust an operation of the RAN node having the degradation. For example, the multi-network management system 130 can increase the rate at which the RAN node transmits KPIs. In some embodiments, the rate can be increased based on a capacity for a particular coverage area. For example, the rate at which the KPI transmissions can be increased for a RAN node corresponding to base station 114C can be based on a capacity associated with base stations 114C and 114D. As another example, the rate at which the KPI transmissions can be increased for a RAN node corresponding to base station 114C can be based on a capacity associated with base stations 114A-114F. In addition, the multi-network management system 130 can adjust an operation of the RAN nodes that do not have the degradation. For example, the multi-network management system 130 can determine that a KPI for a RAN node within coverage area 110B is above the degradation threshold and that one or more RAN nodes within coverage area 110E have a corresponding KPI that is below the degradation threshold, and the multi-network management system 130 can decrease the rates at which the one or more RAN nodes within coverage area 110E transmit additional KPIs, wherein the rate is decreased based on the rate at which the RAN node within coverage area 110B is increased. As another example, the multi-network management system 130 can determine that a KPI for a first RAN node within coverage area 110E is above the degradation threshold and that a second RAN node within coverage area 110E has a KPI that is below the degradation threshold, and the multi-network management system 130 can decrease the rate at which the second RAN node transmits additional KPIs, wherein the rate is decreased based on the rate at which the first RAN node is increased. In some embodiments, the multi-network management system 130 can adjust the rate at which a RAN node having the degradation transmits KPIs, wherein the rate is adjusted based on a capacity of one or more of each of the network managers 116A-116C.

Figure 2:
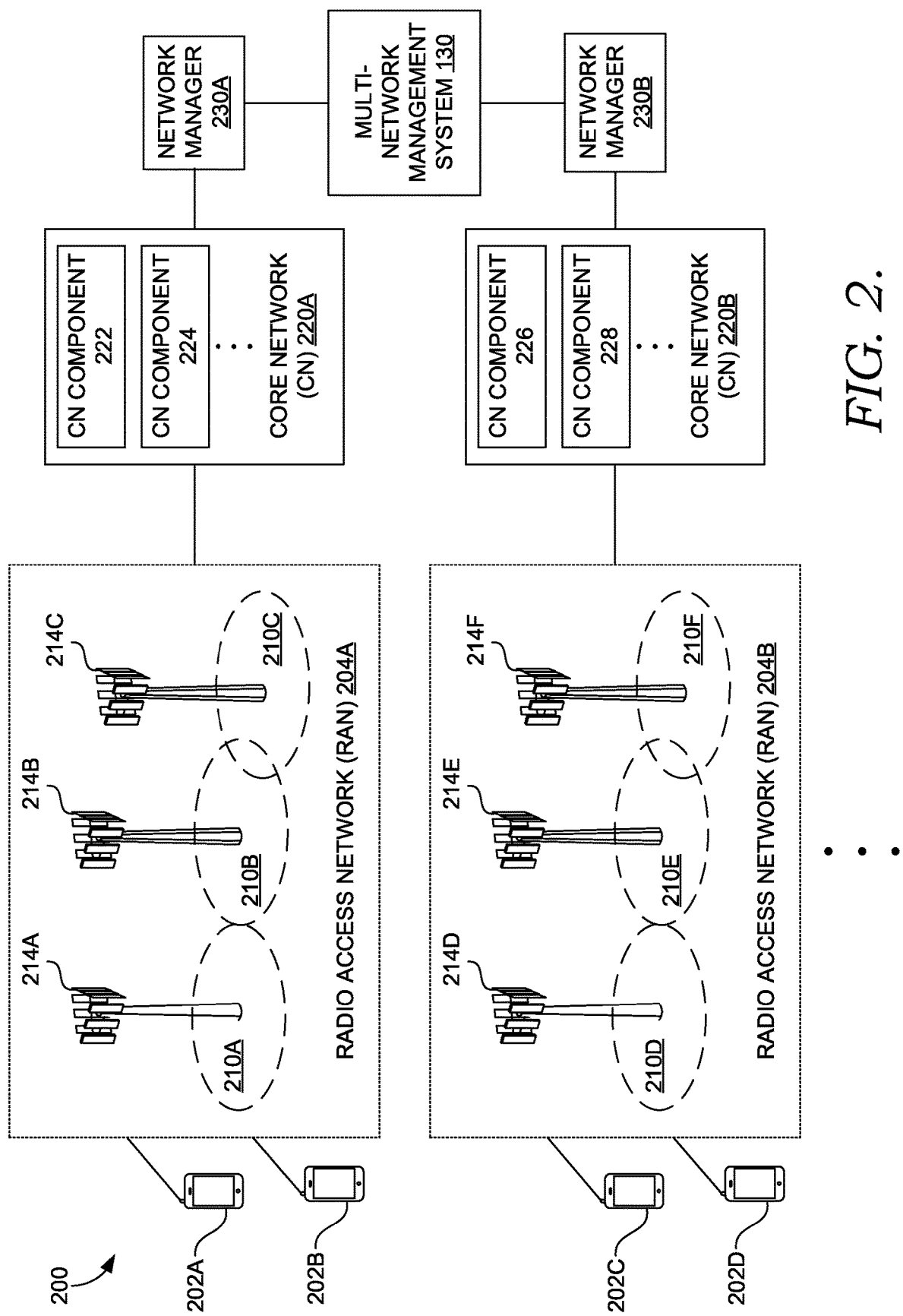
FIG. 2 depicts another example operating environment for the multi-network management system, in accordance with aspects herein.

FIG. 2 provides example operating environment 200 for supporting the multi-network management system 130, in accordance with one or more embodiments disclosed herein. Example environment 200 is but one example of a suitable environment for the multi-network management system 130 and the associated techniques disclosed herein, and is not intended to suggest any limitation as to the scope of use or functionality of the invention. Neither should the environment 200 be interpreted as having any dependency or requirement relating to any one or combination of components illustrated. For example, in some embodiments, the example operating environment 200 can include additional core networks or network managers not depicted.

Example operating environment 200 includes user devices 202A-202D; RAN network 204A including base station 214A having coverage area 210A, base station 214B having coverage area 210B, and base station 214C having coverage area 210C; RAN network 204B including base station 214D having coverage area 210D, base station 214E having coverage area 210E, and base station 214F having coverage area 210F; core network 220A having core network components 222 and 224; core network 220B having core network components 226 and 228; network manager 230A and network manager 230B; and multi-network management system 130. Example operational environment 200 is but one example environment for the multi-network management system 130. For example, another embodiment may include additional radio access networks and core networks.

Figure 5:
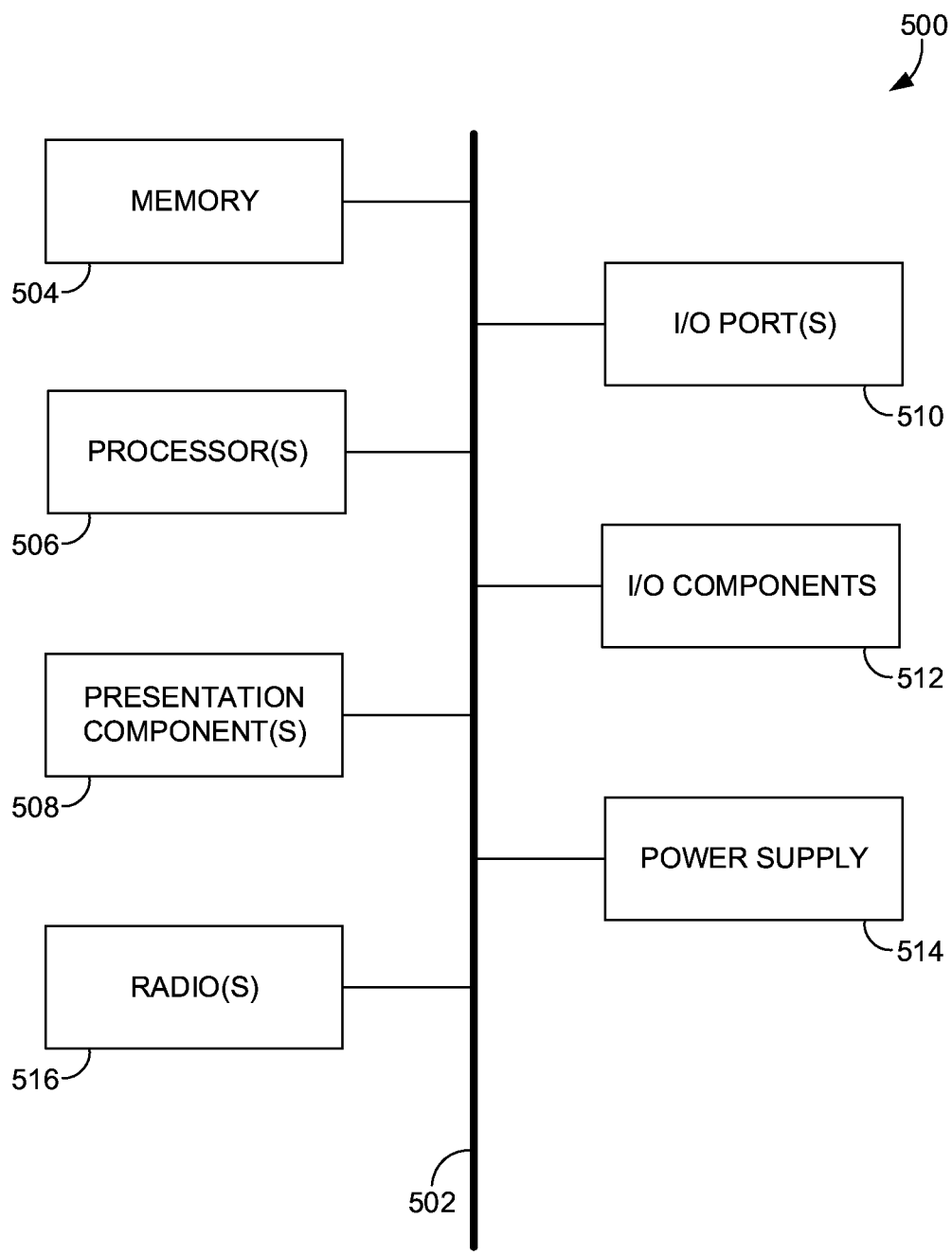
FIG. 5 depicts an example user device suitable for use in implementations of the present disclosure, in accordance with aspects herein.

In some embodiments, user devices 202A-202D are similar to user devices 102A-102D described herein with respect to FIG. 1 or similar to user device 500 described herein with respect to FIG. 5. For example, user devices 202A-202D may include a PC, a laptop computer, a tablet, a mobile phone, a PDA, a server, or any other device that is capable of communicating with other devices (e.g., by transmitting or receiving a signal) using a wireless communication. In some embodiments, base stations 214A-214F are similar to base stations 114A-114F described herein with respect to FIG. 1. For example, in some embodiments, one or more of the base stations 214A-214F can be configured as FD-MIMO, massive MIMO, MU-MIMO, cooperative MIMO, 4G, 5G, another generation communication system, or one or more combinations thereof, for providing telecommunication services to one or more of user devices 202A-202D.

In embodiments, one or more of core networks 220A-220B are an evolved packet core providing E-UTRAN features (e.g., a user plane packet data convergence, radio link control, medium access control, physical layer protocol, control plane radio resource control protocol). Core networks 220A-220B can provide user authentication, tracking, access authorization, Internet Protocol connectivity, and other access functions, other routing functions, or other mobility functions. In some embodiments, one or more of the core network components 222, 224, 226, 228 include an MME, a serving gateway, a packet data network gateway, another core network component, or one or more combinations thereof. In some embodiments, one or more of the core network components 222, 224, 226, 228 may perform one or more operations including an access and mobility management function, a session management function, a user plane function, a policy control function. In some embodiments, one or more of the core network components 222, 224, 226, 228 may include location management functions, MME functionality, serving gateway functionality (e.g., forwarding user data packets), packet data network gateway functionality, another type of core network component functionality, or one or more combinations thereof. In an example embodiment, core network component 222 is a serving gateway and is connected to core network component 224, which is a packet data gateway that can provide internet protocol address allocation. The core network 220A is connected to user devices 202A and 202B via RAN network 204A and the core network 220B is connected to user devices 202C and 202D via RAN network 204B.

In embodiments, network managers 230A-230B can provide network control and management features associated with user devices 202A-202D and associated user device location data. In some embodiments, the network managers 230A-230B are NetAct network managers. In some embodiments, the network managers 230A-230B trace incoming calls of the user devices 202A-202D, collect user device performance data from the user devices 202A-202D, track the location of the user devices 202A-202D via network operation control functions. In some embodiments, network manager 230A is a server with configuration files for base station 214A-214C to download, and network manager 230B is a server with configuration files for base station 214D-214F to download. In some embodiments, each of network managers 230A-230B maintains a database of serving gateways assigned to various tracking area codes. In embodiments, the network manager 230A can allocate a first bandwidth for the base station 214A to transmit that is associated with a value set as an average resource allocation based on base stations 214A-214C. In embodiments, the network manager 230A can provide commission data to base station 214B for the commissioning of an additional bandwidth to be transmitted by the base station 214B for coverage area 210B.

The multi-network management system 130 can receive network performance data including KPIs for each of the RAN nodes, including base stations 214A-214F. In some embodiments, the KPIs are received for a predetermined time period at a predetermined rate. In some embodiments, the KPIs received include one or more particular KPI types. Based on the KPIs for the RAN nodes, the multi-network management system 130 can determine a degradation of at least one RAN node. For example, the multi-network management system 130 may determine a degradation of a particular antenna element or antenna array of base station 214A. Based on the determined degradation, the multi-network management system 130 can increase the rate at which network manager 230A receives a second set of KPIs from base station 214A, wherein the rate at which network manager 230A receives the second set of KPIs is a higher rate than the predetermined rate. In some embodiments, the multi-network management system 130 also determines which RAN nodes, of the other RAN nodes, have KPIs that are below a degradation threshold. Based on determining the RAN nodes that have the KPIs below the degradation threshold, the multi-network management system 130 can decrease the rate at which one or more of network managers 230A-230B receive additional KPIs from those RAN nodes, wherein the rate at which those additional KPIs are received is lower than the predetermined rate.

In some embodiments, the multi-network management system 130 can receive feedback from one or more of the RAN nodes based on a modification to an operation of one of the RAN nodes that has the degradation. For example, the multi-network management system 130 can receive feedback from other RAN nodes that do not have the degradation in response to increasing the rate at which the RAN node having the degradation transmits KPIs. For example, the feedback can include receiving additional KPIs from the other RAN nodes that do not have the degradation and determining averages and standard deviations for each type of the additional KPIs received. In embodiments, the standard deviation can be used for comparing KPIs from particular RAN nodes to identify outliers for additional rate adjustments. In some embodiments, if a portion of the KPIs received at the increased rate from the RAN node having the determined degradation are below the degradation threshold, those KPIs can also be compared to the average and the standard deviation. In some embodiments, the multi-network management system 130 can further increase the rate at which the RAN node having the determined degradation transmits KPIs based on the feedback. In some embodiments, the multi-network management system 130 can also decrease the increased rate at which the RAN node having the determined degradation transmits KPIs based on the feedback, wherein the readjusted rate is still above the predetermined rate.

Figure 3:
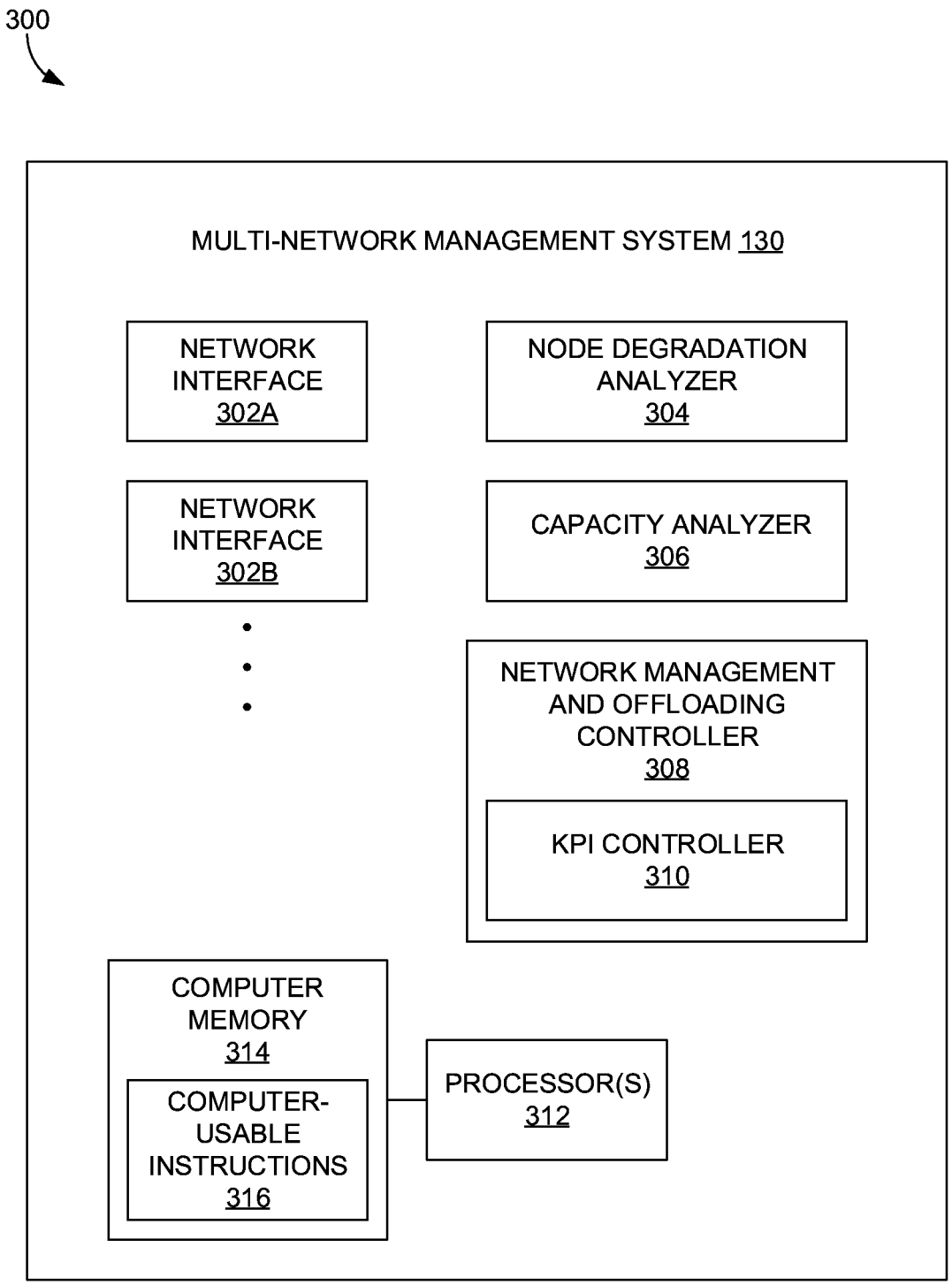
FIG. 3 depicts an example embodiment of the multi-network management system, in accordance with aspects herein.

FIG. 3 includes example operating environment 300 for the multi-network management system 130. Example environment 300 is but one example of a suitable environment for the multi-network management system 130 and the associated techniques disclosed herein, and is not intended to suggest any limitation as to the scope of use or functionality of the invention. Neither should the environment 300 be interpreted as having any dependency or requirement relating to any one or combination of components illustrated. For example, in some embodiments, the example operating environment 300 can include additional processors not depicted. As another example, the node degradation analyzer 304 and the capacity analyzer 306 can be part of the same analyzer.

Example operating environment 300 of the multi-network management system 130 includes network interface 302A, network interface 302B, node degradation analyzer 304, capacity analyzer 306, network management and offloading controller 308 including KPI controller 310, processor(s) 312, and computer memory 314 having computer usable instructions 316.

Network interfaces 302A and 302B, in some embodiments, can be used for communicating with one or more external databases, one or more core networks, one or more network managers, one or more user devices, one or more RAN nodes, one or more radio access networks, one or more other servers, one or more satellites, one or more other devices corresponding to the radio access network, or one or more combinations thereof. In some embodiments, one or more of network interfaces 302A and 302B include Net-Work Interface V3 or a common object request broker architecture. For example, the multi-network management system 130 can receive network performance data corresponding to a first radio access network via network interface 302A and network performance data corresponding to a second radio access network via network interface 302B.

In some embodiments, the multi-network management system 130 receives KPJs from each of a plurality of radio access networks that each have a plurality of RAN nodes. In some embodiments, the KPJs received include one or more KPJ types. The five tables provided below include several non-exhaustive example KPJ types:

TABLE 1

KPIs for the GSM network

| KPI category | Key performance indicators (KPIs) | Definition | Measurement approach | Considerations |
|---|---|---|---|---|
| Availability | Radio coverage-RxLev | Mobile coverage can represents the strength or power level of signal or reception in a given area in which a user device can have access to both data and voice services (e.g., radio coverage measurements [ITU-TE.806]). | Theoretical calculation or Drive test | This parameter can measure the geographic reach of a mobile GSM network. |
| Accessibility | Stand-alone dedicated control channel (SDCCH) assignment success rate | The proportion of user devices which successfully access resources, having requested an appropriate service on accessing the SDCCH (e.g., clause 5.6 of [b-ETSI TR 32.814]). | Real traffic | Secondary This KPI can indicate accessibility for several procedures like call setup, SMS delivery and location update and can also be used to troubleshoot circuit switch (CS) access issues. |
| | Stand-alone dedicated control channel (SDCCH) congestion | The proportion of all SDCCH resource requests and failed due to no SDCCH resource available (e.g., clause 5.7 of [b-ETSI TR 32.814]). | Real traffic | Secondary This KPI can indicate accessibility for several procedures in circuit service. It can show the status of the SDCCH resource utilization. It can also show resource dimensions. When SDCCH is highly congested, TCH utilization can degrade. |
| | Traffic channel (TCH) congestion | The proportion of all requests for TCH resources (call origination and incoming handover) and fail due non available TCH resources (e.g., clause 5.8 of [b-ETSI TR 32.814]). | Real traffic | Primary TCH congestion often increases when traffic demand increases. |
| | Call setup success rate | Measures the proportion of user devices which successfully access a TCH (e.g., clause 5.5 of [b-ETSI TR 32.814]). | Real traffic or test traffic | Primary The preceding KPIs on SDCCH and TCH are sub KPIs of Call Setup Success Rate. Any of the TCH/SDCCH KPIs listed above can impact the call setup success rate. Call setup success rate gives an overview of a call, from initiation to setup. |

TABLE 1-continued

KPIs for the GSM network

| KPI category | Key performance indicators (KPIs) | Definition | Measurement approach | Considerations |
|---|---|---|---|---|
| | Packet data protocol (PDP) context activation success rate | Describes the ratio of all successful PDP context activation to PDP context activation attempts (e.g., clause 7.5 of [ETSI TS 132 410]). | Real traffic or test traffic | Secondary Before data is transferred to and from a base station, a PDP context can be activated. With a low or worse PDP context activation, access to data could be a challenge. |
| Retainability | Traffic channel (TCH) drop rate | The proportion of user devices which, having successfully accessed the TCH, subsequently suffer an abnormal release (e.g., clause 5.3 of [b-ETSI TR 32.814]). | Real traffic or test traffic | Primary TCH drop can be perceived by a user as it directly translates to call drop. |
| | Handover success rate | The percent of handovers that were attempted from the source cell (cell for which the statistic is presented) that succeeded in making it to the destination cell (e.g., clause 5.4 of [b-ETSI TR 32.814]). | Real traffic or test traffic | Secondary Handover can guarantee call continuity and can indicate influencing factors that include among other things, congestion, coverage, interference, and clocking problems. A poor/low handover success rate could influence other KPIs (e.g., TCH drop). |

TABLE 2

Example KPIs for UMTS Network

| Category | Key performance indicators (KPIs) | Definition | Measurement approach | Considerations |
|---|---|---|---|---|
| Availability | Radio coverage- Received signal code power (RSCP) | User device coverage can represent the RSCP level of signal or reception in a given area in which a user device can have successfully access both for data and voice services (e.g., [ITU-T E.806]). | Theoretical calculation or Drive test | This parameter can estimate the geographic reach of a mobile UMTS network. |
| Accessibility | Circuit switch (CS) radio resource control (RRC) setup success rate | Describes the ratio of all successful RRC establishments to RRC establishment attempts (e.g., clause 7.2 of [ETSI TS 132 410]). | Real traffic or test traffic | Primary This KPI can indicate the signalling functions that configures the UE and control planes to allow other functions (e.g., calls, handover, etc.) and resource management to be implemented. This KPI can be used for troubleshooting and dimension purposes. It can be used to determine RNC or cell admission capacity or system load. |
| | Radio access bearer (RAB) establishment success rate for circuit switch (CS) | The ratio of successful conversational speech related RAB establishments to conversational speech related RAB establishment attempts (e.g., clause 7.1.1 of [ETSI TS 132 410]). | Real traffic | Primary Can be used to evaluate speech service accessibility. This KPI can be used to determine planning and dimension, speech calls redirected to gsm, or calls unto the 3G network via incoming IRAT handover. |
| | Radio access bearer (RAB) establishment success rate for packet switch (PS) | Describes the ratio of all successful PS RAB establishments to PS related RAB establishment attempts (e.g., clause 7.1 of [ETSI TS 132 410]). | Real traffic | Primary Can be used to evaluate packet-based service accessibility. |
| | Radio access bearer (RAB) abnormal release rate | Describes the ratio of number of RAB release requests to number of the successful RAB establishments (e.g., clause 8.1 of [ETSI TS 132 410]). | Real traffic or test traffic | Primary Any RAB abnormal release after RAB establishment and alerting can be considered a drop call. |
| Retainability | Soft handover success rate | Describes the ratio of number of successful radio link additions to the total number of radio link addition attempts (e.g., clause 9.1 of [ETSI TS 132 410]). | Real traffic or test traffic | Secondary Measures the simultaneous establishment of links to two base stations. It can indicate that this handover success is high because issues can result in a dropped call. |
| | Circuit switch (CS) inter | Describes the ratio of number of successful inter RAT handover to the total number of the attempted | Real traffic or test traffic | Secondary This KPI can be used to evaluate whether |

TABLE 2-continued

Example KPIs for UMTS Network

| Category | Key performance indicators (KPIs) | Definition | Measurement approach | Considerations |
|---|---|---|---|---|
| | radio access technology (RAT) handover success rate | inter RAT handover from UMTS to GSM for CS domain (e.g., clause 9.3 of [ETSI TS 132 410]). | | the capacity on the cell (i.e., on the GSM network) that the UE is trying to enter for CS may be insufficient or not. Secondary This KPI can be used to evaluate whether the capacity on the cell (i.e., on the GSM network) that the UE is trying to enter for PS may be insufficient or not. |
| | Packet switch (PS) inter RAT handover success rate | Describes the ratio of number of successful inter RAT handover to the total number of the attempted inter RAT handover from UMTS to GSM for PS domain (e.g., clause 9.4 of [ETSI TS 132 410]). | Real traffic or test traffic | |

TABLE 3

Example KPIs for LTE Network

| Category | Key performance indicators (KPIs) | Definition | Measurement approach | Considerations |
|---|---|---|---|---|
| Availability | Radio coverage-RSRP reference signal received power | Mobile coverage essentially represents the strength/power level of signal or reception in a given area in which an end user can have successfully access both for data and voice services (e.g., [ITU-T E.806]). | Theoretical calculation/Drive test | This parameter is important for the estimation of the geographic reach of a mobile LTE network. |
| Accessibility | E-UTRAN radio access bearer (E-RAB) accessibility | Probability for an end-user to be provided with an E-RAB at request (e.g., clause 6.1.1 of [ETSI TS 132 450]). | Real traffic or test traffic | Primary It is a major KPI in LTE for measuring accessibility. For the purposes of optimisation, it helps understand the common failures that usually cause E-RAB setup failures. |
| Retainability | Evolved-UMTS terrestrial radio access network (E-UTRAN) Radio access bearer (E-RAB) abnormal release rate | A measurement that shows how often an end-user abnormally loses an E-RAB during the time the E-RAB is used (e.g., clause 6.2.1.2 of [ETSI TS 132 450]). | Real traffic or test traffic | Primary E-RAB is an important parameter in LTE KPI analysis. An E-RAB abnormal release means that an ongoing session is dropped requiring the user to initiate a new connection to resume the services. |
| Integrity | Latency | A measurement that shows how E-UTRAN impacts on the delay experienced by an end-user. Time from reception of IP packet to transmission of first packet over the air interface (e.g., clause 6.3.2 of [ETSI TS 132 450]). | Test traffic | Primary Latency impacts the network's throughput and thus the user's experience. The higher the latency, the higher the delays and the poorer the user's experience |

TABLE 4

Example KPIs for LTE Network

| LTE KPI | Test Case |
|---|---|
| Accessibility | RRC Connection Establishment |
| | Random Access |
| | Initial E-RAB Establishment Success Rate |
| | RRC Connection Establishment Counters |
| | Initial E-RAB Establishment Success Rate Counters |
| | Added E-RAB Establishment Success Rate Counters |
| | Added E-RAB Establishment Success Rate |
| | S1 Signaling Connection Establishment |
| Retainability | MME Initiated E-RAB & UE Context Release with counters Description |
| | UE Session Time |
| | RBS Initiated E-RAB & UE Context Release with counters Description |
| | MME & RBS Initiated UE Context Release Flow Chart |
| | MME & RBS Initiated E-RAB Release Flow Chart |
| Integrity | E-UTRAN Throughput KPIs |
| | E-UTRAN Latency KPIs |
| | E-UTRAN Packet Loss KPIs |
| Mobility | X2 Based Handover Preparation & Execution |
| | Intra RBS Handover Preparation & Execution |
| | Intra Frequency Handover Preparation & Execution Counters |
| | S1 Based Handover Preparation & Execution |
| | Intra-frequency intra-LTE S1 & X2 Handover Flowchart |
| | Inter Frequency Handover Preparation & Execution Counters |
| | Inter-frequency intra-LTE S1 & X2 Handover Flowchart |
| Availability | Partial cell availability (node restarts excluded) |

TABLE 5

Example KPIs for 5G Network

| 5G performance requirement type | Minimum KPI requirement | category |
|---|---|---|
| Peak Data Rate | Downlink: 20 Gbps<br>Uplink: 10 Gbps | eMBB |
| Peak Spectral Efficiency | Downlink: 30 bits/sec/Hz<br>Uplink: 15 bits/sec/Hz | eMBB |
| Data rate experienced by User | Downlink: 100 Mbps<br>Uplink: 50 Mbps | eMBB |
| Area Traffic Capacity | Downlink: 10 Mbits/sec/m$^2$ in indoor hotspot (eMBB test environment) | eMBB |
| Latency (User Plane) | 4 ms for eMBB<br>1 ms for URLLC | eMBB, URLLC |
| Latency (User Plane) | 20 ms<br>(10 ms encouraged) | eMBB, URLLC |
| Connection Density | 1 × 10$^6$ devices/Km$^2$ | mMTC |
| Average Spectral Efficiency | (All the below figures are in units of bits/sec/Hz/TRxP)<br>Indoor hotspot: DL: 9/UL: 6.75<br>Dense Urban: DL: 7.8/UL: 5.4<br>Rural: DL: 3.3/UL: 1.6 | eMBB |
| Energy Efficiency | Efficient data transmission (Loaded case):<br>To be demonstrated by "average spectral efficiency".<br>Low energy consumption (no data case):<br>This test case should support high sleep ratio/long sleep duration. | eMBB |
| Reliability | 1 × 10$^{-5}$ probability of transmitting layer-2 Power Distribution Unit (PDU) of 32 bytesi n size within 1 ms (in channel quality of coverage edge for Urban Macro-URLLC test environment.) | URLLC |
| Mobility | Dense Urban: up to 30 Km/h<br>Rural: up to 500 Km/h | eMBB |
| Mobility Interruption Time | 0 ms | eMBB, URLLC |
| Bandwidth (Maximum Aggregated System) | At least 100 MHz<br>Up to 1 GHz for operation in high frequency bands i.e. above 6 GHz | IMT-2020 |

The multi-network management system 130 can receive one or more of the example KPIs in the tables above, or one or more combinations of these example KPIs. Additionally, the multi-network management system 130 can process each KPI received (e.g., via network interface 302A or network interface 302B) using one or more processors 312 via the computer readable memory 314 and the computer-usable instructions. For example, the node degradation analyzer 304 can determine that one or more RAN nodes have a degradation based on the KPIs received.

In some embodiments, the node degradation analyzer 304 can determine a first RAN node of a first radio access network has a KPI above a degradation threshold. In some embodiments, the KPI that is above the degradation threshold is an average spectral efficiency KPIL In some embodiments, one or more KPIs for the first RAN node correspond to a particular bandwidth corresponding to an operation in a high frequency band, a probability of transmitting a particular layer-2 Power Distribution Unit (PDU) within a predetermined period of time, a mobility measurement, an RCC connection establishment, another type of KPI, or one or more combinations thereof. In some embodiments, the node degradation analyzer 304 can determine additional RAN nodes corresponding to the first radio access network or another radio access network having degradation (e.g., based on comparing a corresponding KPI to the degradation threshold). In some embodiments, the node degradation analyzer 304 can determine and identify one or more RAN nodes (e.g., corresponding to the first radio access network or another radio access network) that do not have the degradation (e.g., based on comparing a corresponding KPI to the degradation threshold).

The capacity analyzer 306 can determine a capacity for a base station, a satellite, an antenna element or antenna array of a base station or satellite, a network manager, another type of capacity, or one or more combinations thereof. In some embodiments, the capacity analyzer 306 can determine a total capacity for each of the network managers in communication with the multi-network management system 130. In some embodiments, the capacity analyzer 306 can determine a total capacity for each of the RAN nodes in communication with the multi-network management system 130. In some embodiments, the capacity analyzer 306 can determine a first capacity associated with a first network manager of the first RAN node having the degradation. In some embodiments, the capacity analyzer 306 can determine a second capacity associated with a second network manager in communication with a plurality of RAN nodes. In some embodiments, the capacity analyzer 306 can determine a third capacity associated with a third network manager in communication with a plurality of RAN nodes. In an embodiment, the capacity analyzer 306 can determine a total capacity based on the rate at which the first network manager receives a first set of KPIs, an identified first set of RAN nodes having KPIs below the degradation threshold, and the number of RAN nodes having the KPI that is above the degradation threshold.

The network management and offloading controller 308 can provide instructions to each of the plurality of RAN nodes for each of the radio access networks. For example, the KPI controller 310 can increase the rate at which the first network manager (of the first RAN node having the degradation) receives a second set of additional KPIs from the first RAN node, the rate being based on a first capacity associated with the first network manager and a first set of RAN nodes in communication with the first network manager. In some embodiments, the rate can be increased additionally based on a total capacity determined by the capacity analyzer 306. In some embodiments, the KPI controller 310 can increase the rate at which the first RAN node having the degradation transmits the second set of additional KPIs.

In some embodiments, the KPI controller 310 can increase the rate at which the second network manager receives an additional set of KPIs from a second RAN node having a degradation, the rate being based on a second capacity associated with the second network manager and the second set of RAN nodes in communication with the second network manager. In some embodiments, the KPI controller 310 can decrease the rate at which one or more RAN nodes that do not have the degradation transmit KPIs. In some embodiments, the decrease is based on a capacity of the corresponding network manager or a total capacity associated with a plurality of network managers. In some embodiments, the KPI controller 310 can decrease the rate at which the first network manager receives a fourth set of KPIs from a third RAN node in communication with the first network manager, wherein the third RAN node does not have the degradation, the rate being decreased based on the first capacity. In some embodiments, the KPI controller 310 can decrease the rate at which the second network manager receives a fifth set of KPIs from a fourth RAN node in communication with the second network manager, wherein the fourth RAN node has a KPI below the degradation threshold, the rate being decreased based on the second capacity.

In an embodiment, the node degradation analyzer 304 determines that a KPI received for each of a second set of RAN nodes corresponding to the second network manager are below a degradation threshold, and the KPI controller 310 decreases the rate at which the second network manager receives a third set of KPIs from the second set of RAN nodes based on the degradation for the first RAN node and based on the KPI received for each of the second set of RAN nodes being below the degradation threshold. Continuing the example, the rate at which the second network manager receives the third set of KPIs from the second set of RAN nodes can be decreased by the KPI controller 310 based on the first capacity and a second capacity associated with the second network manager and the second set of RAN nodes, and the rate at which the first network manager receives the second set of KPIs from the first RAN node can be increased based on the first capacity and the second capacity.

In an embodiment, the node degradation analyzer 304 can identify a first set of RAN nodes that each have a KPI that is below the degradation threshold based on the KPIs received, and the KPI controller 310 can increase the rate at which the first network manager receives the additional KPIs from the first RAN node having the degradation based on identifying the first set of RAN nodes. For example, the increase to the rate can be based on the total number of the identified first set of RAN nodes that each have a KPI that is below the degradation threshold. As another example, the increase to the rate can be based on a capacity associated with each of the first set of RAN nodes. In yet another example, the increase to the rate can be based on a first amount by which the KPI was over the degradation threshold, and a second amount by which each KPI of the first set of RAN nodes was below the degradation threshold.

Figure 4:
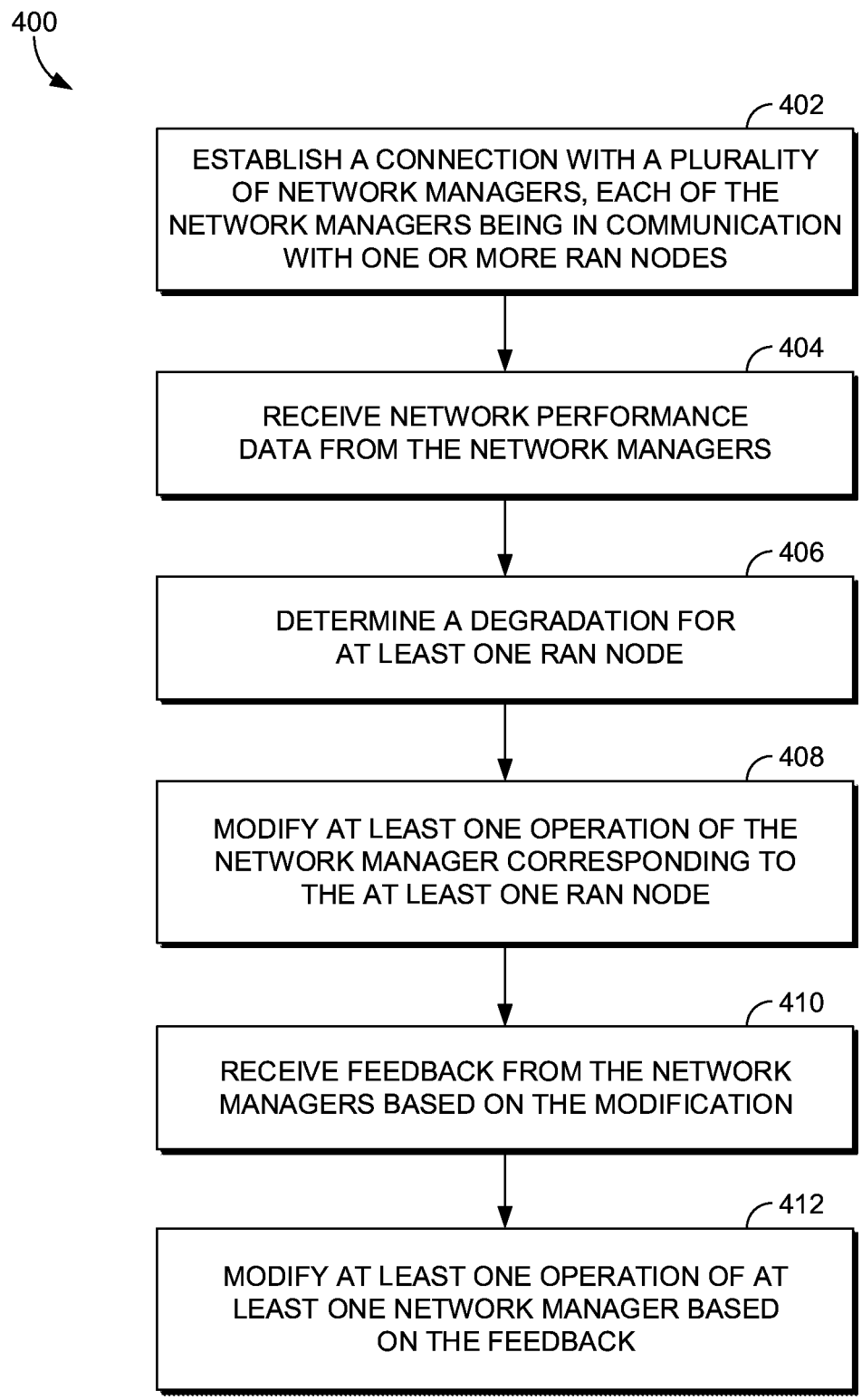
FIG. 4 illustrates an example flowchart for utilizing the multi-network management system, in accordance with aspects herein.

FIG. 4 includes example flowchart 400 for utilizing the multi-network management system. For example, Step 402 includes the multi-network management system establishing a connection with a plurality of network managers, wherein each of the plurality of network managers are in communication with one or more RAN nodes. In some embodiments, the multi-network management system is connected with the plurality of network managers over one or more backhaul links (e.g., via an X2, Xn, or other interface) either directly (e.g., directly between base stations), or indirectly (e.g., via core network), or one or more combinations thereof. The backhaul links may be or include one or more wireless links, for example.

At Step 404, the multi-network management system receives network performance data from each of the plurality of network managers, wherein the network performance data is received for each of the one or more RAN nodes in communication with each of the plurality of network managers. In some embodiments, the multi-network management system receives a first set of network performance data from a first RAN node corresponding to a first network manager, a second set of network performance data from a second RAN node corresponding to the first network manager, a third set of network performance data from a third RAN node corresponding to a second network manager, a fourth set of network performance data from a fourth RAN node corresponding to the second network manager, a fifth set of network performance data from a fifth RAN node corresponding to a third network manager, and a sixth set of network performance data from a sixth RAN node corresponding to the third network manager. In one aspect, the first RAN node and the second RAN node are different types of RAN nodes. In some embodiments, the first node and the third node are above a threshold distance from each other. In some embodiments, the first network manager receives a seventh set of network performance data from the first RAN node, wherein the seventh set of network performance data is received within a duration of time after receiving the first set of network performance data.

In some embodiments, the multi-network management system can identify a first set of RAN nodes that are in communication with one or more of the plurality of network managers based on receiving the network performance data, wherein the network performance data for each of the first set of RAN nodes is below a degradation threshold. Additionally or alternatively, the multi-network management system can identify a second set of RAN nodes that are in communication with one or more of the plurality of network managers based on receiving the network performance data, wherein the network performance data for each of the second set of RAN nodes is above the degradation threshold. In some embodiments, the first set of RAN nodes can include the second RAN node in communication with the first network manager and the sixth RAN node in communication with the third network manager.

In some embodiments, the multi-network management system can determine a first capacity for the first network manager, a second capacity for the second network manager, and a third capacity for the third network manager. In some embodiments, the multi-network management system can determine a total capacity for the first network manager, the second network manager, and the third network manager (e.g., a total capacity associated with each of the network managers in communication with the multi-network management system). In some embodiments, the multi-network management system establishes a connection with over forty network managers.

At Step 406, the multi-network management system determines a degradation for a first RAN node based on receiving the network performance data. For example, the multi-network management system can determine a first RAN node of the second set of RAN nodes has the network performance data above the degradation threshold. In some embodiments, the multi-network management system can determine the degradation for the first RAN node based on at least one KPI received for the first RAN node being above the degradation threshold for a predetermined period of time. In some embodiments, the multi-network management system determines the degradation for the first RAN node based on the first RAN node having a highest network performance data value compared to each of the other network performance data received. In some embodiments, the multi-network management system can identify a particular RAN node having a lowest network performance data value compared to each of the other network performance data received. In some embodiments, the multi-network management system determines other RAN nodes have a degradation based on receiving the network performance data for each of those RAN nodes.

In some embodiments, the multi-network management system can determine that a first set of KPIs received for a third RAN node and a fourth RAN node of at least one set of RAN nodes are below a degradation threshold. In some embodiments, the multi-network management system can determine that at least one KPI received for each of a particular set of RAN nodes are below a degradation threshold. In some embodiments, the multi-network management system can determine that a predetermined portion of a first set of KPIs received are above or below the degradation threshold. For example, the predetermined portion can be based on the number of RAN nodes within a particular coverage area, a capacity corresponding to each RAN node within the particular coverage area, a capacity corresponding to network equipment within the coverage area, or one or more combinations thereof. In some embodiments, the multi-network management system can determine an average for a particular set of KPIs and a standard deviation based on that average for comparisons. For example, the multi-network management system can determine that a threshold number of a set of KPIs received for one or more RAN nodes are outside of the standard deviation.

At Step 408, the multi-network management system modifies at least one operation of a RAN node. For example, the multi-network management system can increase the rate at which a first network manager receives an additional set of network performance data (e.g., KPIs) from the first RAN node based on the determined degradation for the first RAN node. In some embodiments, the rate at which the first network manager receives the additional set of KPIs can be based on a first capacity associated with the first network manager and a set of RAN nodes that are in communication with the first network manager. In some embodiments, the decrease in the rate is based on a total capacity associated with each network manager in communication with the multi-network management system. In some embodiments, the multi-network management system increases the rate at which a second RAN node corresponding to the first network manager or another network manager transmits additional KPIs based on a degradation for the second RAN node. In some embodiments, the rate at which the second RAN node transmits the additional set of KPIs can be based on a total capacity associated with each RAN node in communication with the multi-network management system.

In an example embodiment, the multi-network management system can determine that the first set of KPIs received for a third RAN node of a first set of RAN nodes corresponding to a first network manager and a fourth RAN node of a second set of RAN nodes corresponding to a second network manager are below a degradation threshold, and the multi-network management system can decrease the rate at which the first network manager receives an additional set of KPIs from the third RAN node, the rate being decreased based on a first capacity of the first network manager. In addition, the multi-network management system can decrease the rate at which the second network manager receives an additional set of KPIs from the fourth RAN node, the rate being decreased based on a second capacity of the second network manager. In some embodiments, the multi-network management system can decrease the rate at which a second network manager receives an additional set of KPIs from each of the RAN nodes in communication with the second network manager based on an increase to the rate at which a first RAN node transmits KPIs to a first network manager and also based on a determination that the KPIs received from each of the RAN nodes in communication with the second network manager are below the degradation threshold.

In some embodiments, an increase in the rate at which a first RAN node transmits KPIs to a network manager can be increased, via instructions from the multi-network management system, based on a total capacity associated with a plurality of network managers, and the rate at which another RAN node transmits KPIs to its corresponding network manager can be decreased based on the total capacity, wherein a previously received KPI transmitted by the other RAN node is below a degradation threshold. In some embodiments, the degradation determined for a first RAN node can be based on a first KPI, and the multi-network management system can increase the rate at which the first RAN node transmits a second set of KPIs, wherein the second set of KPIs are of a different type of KPI than the first KPI. As one non-limiting example, the first KPI may be a data rate experienced by a user device in communication with the first RAN node and the second set of KPIs can include one or more of a traffic area capacity and a Mobility Interruption Time.

At Steps 410 and 412, the multi-network management system can receive feedback from one or more network managers in communication with the multi-network management system based on modifying the at least one operation corresponding to the at least one RAN node having the determined degradation. Further, based on the feedback received, the multi-network management system can modify another operation corresponding to a RAN node. In some embodiments, the multi-network management system can receive a second set of KPIs at an increased rate for a predetermined period of time for a first RAN node having the degradation, and the multi-network management system can also determine that a predetermined portion of the second set of KPIs are below the degradation threshold. For example, the predetermined portion can be based on an average of the second set of KPIs. Further, the multi-network management system can receive a third set additional of KPIs, from a first set of RAN nodes having KPIs below the degradation threshold, for a predetermined period of time. In addition, the multi-network management system can determine a standard deviation for the third set of additional KPIs from the first set of RAN nodes. Further, the multi-network management system can also determine that a threshold number of the second set of KPIs, received at the increased rate for the predetermined period of time for the first RAN node having the degradation, are outside of the standard deviation. Based on this, the multi-network management system can decrease the rate at which the first RAN node transmits a fourth set of KPIs, wherein the rate at which the fourth set of KPIs transmitted is a higher rate than the rate at which the third set of KPIs are transmitted.

Example User Device

Having described the example embodiments discussed above of the presently disclosed technology, an example operating environment of an example user device (e.g., user device 102A of FIG. 1) is described below with respect to FIG. 5. User device 500 is but one example of a suitable computing environment, and is not intended to suggest any particular limitation as to the scope of use or functionality of the technology disclosed. Neither should user device 500 be interpreted as having any dependency or requirement relating to any particular component illustrated, or a particular combination of the components illustrated in FIG. 5.

As illustrated in FIG. 5, example user device 500 includes a bus 502 that directly or indirectly couples the following devices: memory 504, one or more processors 506, one or more presentation components 508, one or more input/output (I/O) ports 510, one or more I/O components 512, a power supply 514, and one or more radios 516.

Bus 502 represents what may be one or more busses (such as an address bus, data bus, another type of bus, or one or more combinations thereof). Although the various blocks of FIG. 5 are shown with lines for the sake of clarity, in reality, these blocks represent logical, not necessarily actual, components. For example, one may consider a presentation component, such as a display device, to be an I/O component. Also, processors have memory. Accordingly, FIG. 5 is merely illustrative of an exemplary user device that can be used in connection with one or more embodiments of the technology disclosed herein.

User device 500 can include a variety of computer-readable media. Computer-readable media can be any available media that can be accessed by user device 500 and may include both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information, such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by user device 500. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. One or more combinations of any of the above should also be included within the scope of computer-readable media.

Memory 504 includes computer storage media in the form of volatile and/or nonvolatile memory. The memory 504 may be removable, non-removable, or a combination thereof. Example hardware devices of memory 504 may include solid-state memory, hard drives, optical-disc drives, other hardware, or one or more combinations thereof. As indicated above, the computer storage media of the memory 504 may include RAM, Dynamic RAM, ROM, EEPROM, flash memory or other memory technology, CD-ROM, a cache memory, DVDs or other optical disk storage, magnetic cassettes, magnetic tape, magnetic disk storage or other magnetic storage devices, a short-term memory unit, a long-term memory unit, any other medium which can be used to store the desired information and which can be accessed by user device 500, or one or more combinations thereof.

The one or more processors 506 of user device 500 can read data from various entities, such as the memory 504 or the I/O component(s) 512. The one or more processors 506 may include, for example, one or more microprocessors, one or more CPUs, a digital signal processor, one or more cores, a host processor, a controller, a chip, a microchip, one or more circuits, a logic unit, an integrated circuit (IC), an application-specific IC (ASIC), any other suitable multi-purpose or specific processor or controller, or one or more combinations thereof. In addition, the one or more processors 506 can execute instructions, for example, of an operating system of the user device 500 or of one or more suitable applications.

The one or more presentation components 508 can present data indications via user device 500, another user device, or a combination thereof. Example presentation components 508 may include a display device, speaker, printing component, vibrating component, another type of presentation component, or one or more combinations thereof. In some embodiments, the one or more presentation components 508 may comprise one or more applications or services on a user device, across a plurality of user devices, or in the cloud. The one or more presentation components 508 can generate user interface features, such as graphics, buttons, sliders, menus, lists, prompts, charts, audio prompts, alerts, vibrations, pop-ups, notification-bar or status-bar items, in-app notifications, other user interface features, or one or more combinations thereof.

The one or more I/O ports 510 allow user device 500 to be logically coupled to other devices, including the one or more I/O components 512, some of which may be built in. Example I/O components 512 can include a microphone, joystick, game pad, satellite dish, scanner, printer, wireless device, and the like. The one or more I/O components 512 may, for example, provide a natural user interface (NUI) that processes air gestures, voice, or other physiological inputs generated by a user. In some instances, the inputs the user generates may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with the one or more presentation components 508 on the user device 500. In some embodiments, the user device 500 may be equipped with one or more imaging devices, such as one or more depth cameras, one or more stereoscopic cameras, one or more infrared cameras, one or more RGB cameras, another type of imaging device, or one or more combinations thereof, (e.g., for gesture detection and recognition). Additionally, the user device 500 may, additionally or alternatively, be equipped with accelerometers or gyroscopes that enable detection of motion. In some embodiments, the output of the accelerometers or gyroscopes may be provided to the one or more presentation components 508 of the user device 500 to render immersive augmented reality or virtual reality.

The power supply 514 of user device 500 may be implemented as one or more batteries or another power source for providing power to components of the user device 500. In embodiments, the power supply 514 can include an external power supply, such as an AC adapter or a powered docking cradle that supplements or recharges the one or more batteries. In aspects, the external power supply can override one or more batteries or another type of power source located within the user device 500.

Some embodiments of user device 500 may include one or more radios 516 (or similar wireless communication components). The one or more radios 516 can transmit, receive, or both transmit and receive signals for wireless communications. In embodiments, the user device 500 may be a wireless terminal adapted to receive communications and media over various wireless networks. User device 500 may communicate using the one or more radios 516 via one or more wireless protocols, such as code division multiple access ("CDMA"), global system for mobiles ("GSM"), time division multiple access ("TDMA"), another type of wireless protocol, or one or more combinations thereof. In embodiments, the wireless communications may include one or more short-range connections (e.g., a Wi-Fi® connection, a Bluetooth connection, a near-field communication connection), a long-range connection (e.g., CDMA, GPRS, GSM, TDMA, 802.16 protocols), or one or more combinations thereof. In some embodiments, the one or more radios 516 may facilitate communication via radio frequency signals, frames, blocks, transmission streams, packets, messages, data items, data, another type of wireless communication, or one or more combinations thereof. The one or more radios 516 may be capable of transmitting, receiving, or both transmitting and receiving wireless communications via mm waves, FD-MIMO, massive MIMO, 3G, 4G, 5G, 6G, another type of Generation, 802.11 protocols and techniques, another type of wireless communication, or one or more combinations thereof.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software. For instance, various functions may be carried out by a processor executing instructions stored in memory. As such, other arrangements and elements (for example, machines, interfaces, functions, orders, and groupings of functions, and the like) can be used in addition to, or instead of, those shown.

Embodiments of the present disclosure have been described with the intent to be illustrative rather than restrictive. Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

Many different arrangements of the various components depicted, as well as components not shown, are possible without departing from the scope of the claims below.

Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A system for capacity management, the system comprising:
   a plurality of radio access network (RAN) nodes comprising a first set of RAN nodes and a second set of RAN nodes, the first set of RAN nodes being farther than a threshold distance from the second set of RAN nodes;
   a first network manager in communication with the first set of RAN nodes and a second network manager in communication with the second set of RAN nodes; and
   a multi-network management system capable of communicating with the plurality of RAN nodes for capacity management of the plurality of RAN nodes based on key performance indicators (KPIs), the multi-network management system configured to perform operations comprising:
      receiving, from the first network manager and the second network manager, a first set of KPIs that includes at least one KPI for each of the plurality of RAN nodes;
      determining a degradation for a first RAN node of the first set of RAN nodes based on receiving the first set of KPIs; and
      based on the degradation for the first RAN node, increasing a rate at which the first network manager receives a second set of KPIs from the first RAN node, the rate being based on a first capacity associated with the first network manager and the first set of RAN nodes.

2. The system according to claim 1, wherein the first set of KPIs is received in real-time.

3. The system according to claim 1, wherein the multi-network management system is configured to perform additional operations comprising:
   determining a degradation for a second RAN node of the second set of RAN nodes based on receiving the first set of KPIs; and
   based on the degradation for the second RAN node, increasing the rate at which the second network manager receives a third set of KPIs from the second RAN node, the rate being based on a second capacity associated with the second network manager and the second set of RAN nodes.

4. The system according to claim 3, wherein the multi-network management system is configured to perform additional operations comprising:
   determining that the first set of KPIs received for a third RAN node of the first set of RAN nodes and a fourth RAN node of the second set of RAN nodes are below a degradation threshold;
   based on the third RAN node having the at least one KPI below the degradation threshold, decreasing the rate at which the first network manager receives a fourth set of KPIs from the third RAN node, the rate being decreased based on the first capacity; and
   based on the fourth RAN node having the at least one KPI below the degradation threshold, decreasing the rate at which the second network manager receives a fifth set of KPIs from the fourth RAN node, the rate being decreased based on the second capacity.

5. The system according to claim 1, wherein the multi-network management system is configured to perform additional operations comprising:
   determining that the at least one KPI received for each of the second set of RAN nodes are below a degradation threshold; and
   based on the degradation for the first RAN node and based on the at least one KPI received for each of the second set of RAN nodes being below the degradation threshold, decreasing the rate at which the second network manager receives a third set of KPIs from the second set of RAN nodes.

6. The system according to claim 5, wherein the rate at which the second network manager receives the third set of KPIs from the second set of RAN nodes is decreased based on the first capacity and a second capacity associated with the second network manager and the second set of RAN nodes, and wherein the rate at which the first network manager receives the second set of KPIs from the first RAN node is increased based on the first capacity and the second capacity.

7. The system according to claim 1, wherein the second set of KPIs includes different KPI types than the at least one KPI received for the first RAN node.

8. The system according to claim 1, wherein the degradation for the first RAN node is determined based on the at least one KPI received for the first RAN node being above a degradation threshold for a predetermined period of time.

9. A method for capacity management, the method comprising:
   receiving, via a multi-network management system, a plurality of KPIs from a plurality of network managers, each of the plurality of network managers corresponding to one or more RAN nodes;
   determining, via the multi-network management system, that at least one of the plurality of KPIs is above a degradation threshold;
   determining, via the multi-network management system, a degradation for at least one RAN node of the plurality of RAN nodes based on the at least one of the plurality of KPIs being above the degradation threshold; and
   based on the degradation for the at least one RAN node, increasing a rate, via the multi-network management system, at which a first network manager of the plurality of network managers receives a first set of KPIs from the at least one RAN node, the rate being based on a first capacity associated with the first network manager.

10. The method according to claim 9, further comprising identifying a first set of RAN nodes of the plurality of RAN nodes based on receiving the plurality of KPIs, wherein each RAN node of the first set of RAN nodes has a KPI that is below the degradation threshold, and wherein the rate at which the first network manager receives the first set of KPIs is increased based on identifying the first set of RAN nodes.

11. The method according to claim 10, further comprising:
   determining a number of the plurality of RAN nodes, in addition to the at least one RAN node of the plurality of RAN nodes, that each have the KPI, of the plurality of KPIs, that is above the degradation threshold;
   determining a total capacity based on the rate at which the first network manager receives the first set of KPIs, the identified first set of RAN nodes, and the number of the plurality of RAN nodes having the KPI that is above the degradation threshold; and
   decreasing the rate at which the multi-network management system is to receive the first set of KPIs for the first set of RAN nodes, the rate being decreased based on the total capacity.

12. The method according to claim 9, wherein the rate is increased for a predetermined period of time.

13. The method according to claim 12, further comprising:
   identifying a first set of RAN nodes of the plurality of RAN nodes that each have a KPI of the plurality of KPIs that is below the degradation threshold;
   identifying a first set of network managers of the plurality of network managers corresponding to each of the first set of RAN nodes;
   receiving the first set of KPIs from the first network manager at the increased rate for the predetermined period of time;
   determining that a predetermined portion of the first set of KPIs received are below the degradation threshold;
   receiving a second set of KPIs, from the first set of network managers for the first set of RAN nodes, for the predetermined period of time;
   determining a standard deviation for the second set of KPIs;
   determining that a threshold number of the first set of KPIs are outside of the standard deviation; and
   decreasing the rate at which the first network manager receives a third set of KPIs from the at least one RAN node, wherein the rate at which the first network manager receives the third set of KPIs from the at least one RAN node is a higher rate than the rate at which the first set of network managers receive the second set of KPIs.

14. The method according to claim 9, wherein each of the plurality of network managers are above a threshold distance from each of the other network managers.

15. One or more non-transitory computer storage media having computer-executable instructions embodied thereon, that when executed by at least one processor, cause the at least one processor to perform a method comprising:
   establishing a connection with a plurality of network managers, wherein each of the plurality of network managers are in communication with one or more RAN nodes;
   receiving network performance data from a first network manager of the plurality of network managers, wherein the network performance data is received for each of a plurality of RAN nodes in communication with the first network manager;
   determining a degradation for at least one RAN node of the plurality of RAN nodes based on receiving the network performance data from the first network manager; and
   based on the degradation for the at least one RAN node, causing an increase in a rate at which the first network manager of the plurality of network managers receives a first set of network performance data from the at least one RAN node.

16. The one or more non-transitory computer storage media of claim 15, wherein the increase in the rate is based on a total capacity associated with each of the plurality of network managers.

17. The one or more non-transitory computer storage media of claim 15, the method further comprising:

identifying a first set of RAN nodes that are in communication with one or more of the plurality of network managers, the network performance data for each of the first set of RAN nodes being below a degradation threshold; and causing a decrease in the rate at which the one or more of the plurality of network managers receives a second set of network performance data from the first set of RAN nodes.

18. The one or more non-transitory computer storage media of claim 17, wherein the decrease in the rate is based on a total capacity associated with each of the plurality of network managers.

19. The one or more non-transitory computer storage media of claim 17, the method further comprising:

receiving the first set of network performance data from the first network manager at the increased rate;

receiving the second set of network performance data for the first set of RAN nodes at the decreased rate; and modifying an operation for at least one network manager of the plurality of network managers based on the first set of network performance data and the second set of network performance data.

20. The one or more non-transitory computer storage media of claim 15, the method further comprising:

receiving network performance data for a RAN node from a second network manager of the plurality of network managers;

determining that the network performance data for the RAN node is above a degradation threshold; and causing an increase in the rate at which the second network manager receives additional network performance data from the RAN node, the increase in the rate based on a capacity of the second network manager.

* * * * *